(12) United States Patent
Yoneyama

(10) Patent No.: US 6,885,506 B2
(45) Date of Patent: Apr. 26, 2005

(54) WIDE-ANGLE ZOOM LENS SYSTEM

(75) Inventor: Shuji Yoneyama, Saitama (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 10/770,441

(22) Filed: Feb. 4, 2004

(65) Prior Publication Data

US 2004/0156120 A1 Aug. 12, 2004

(30) Foreign Application Priority Data

Feb. 5, 2003  (JP) .......................... 2003-27946

(51) Int. Cl.$^7$ ............................................ G02B 15/14
(52) U.S. Cl. .................... 359/682; 359/683; 359/714; 359/753; 359/770
(58) Field of Search .................... 359/676, 680–682, 359/683, 714, 749–753, 770

(56) References Cited

U.S. PATENT DOCUMENTS

| | | | |
|---|---|---|---|
| 5,774,267 A | | 6/1998 | Kodama et al. ............ 359/557 |
| 5,847,875 A | * | 12/1998 | Kodama et al. ............ 359/557 |
| 6,008,952 A | * | 12/1999 | Yamamoto ................. 359/683 |
| 6,108,136 A | * | 8/2000 | Yamanashi ................. 359/682 |
| 6,137,638 A | | 10/2000 | Yamagishi et al. ......... 359/682 |
| 6,222,680 B1 | | 4/2001 | Yamamoto et al. ......... 359/680 |
| 6,246,529 B1 | | 6/2001 | Sensui ....................... 359/680 |
| 6,480,340 B1 | | 11/2002 | Yamamoto ................. 359/676 |
| 6,515,803 B2 | | 2/2003 | Hirose ........................ 359/682 |
| 6,542,311 B2 | | 4/2003 | Nagahara ................... 359/676 |
| 6,545,817 B2 | | 4/2003 | Hirose ........................ 359/683 |
| 6,580,564 B2 | * | 6/2003 | Nagahara ................... 359/683 |
| 6,587,279 B2 | | 7/2003 | Narimatsu et al. ......... 359/683 |
| 6,738,196 B2 | * | 5/2004 | Yamamoto ................. 359/680 |
| 2002/0181120 A1 | * | 12/2002 | Nagahara ................... 359/683 |
| 2003/0165019 A1 | * | 9/2003 | Yamamoto ................. 359/683 |
| 2003/0184874 A1 | * | 10/2003 | Nagahara ................... 359/680 |

FOREIGN PATENT DOCUMENTS

| | | |
|---|---|---|
| JP | 9-230242 | 9/1997 |
| JP | 7-306362 | 11/1997 |
| JP | 2000-131611 | 5/2000 |
| JP | 2000-292701 | 10/2000 |

* cited by examiner

*Primary Examiner*—Evelyn A. Lester
(74) *Attorney, Agent, or Firm*—Greenblum & Bernstein, P.L.C.

(57) ABSTRACT

A wide-angle zoom lens system includes a negative first lens group, a positive second lens group, a positive third lens group, a negative fourth lens group, and a positive fifth lens group. Upon zooming from the short to the long focal length extremities, the first lens group moves toward the image and thereafter moves toward the object, the distance between the first and second lens group decreases, the distance between the second and third lens groups decreases, the distance between the third and fourth lens groups increases, and the distance between the fourth and fifth lens groups decreases.

18 Claims, 17 Drawing Sheets

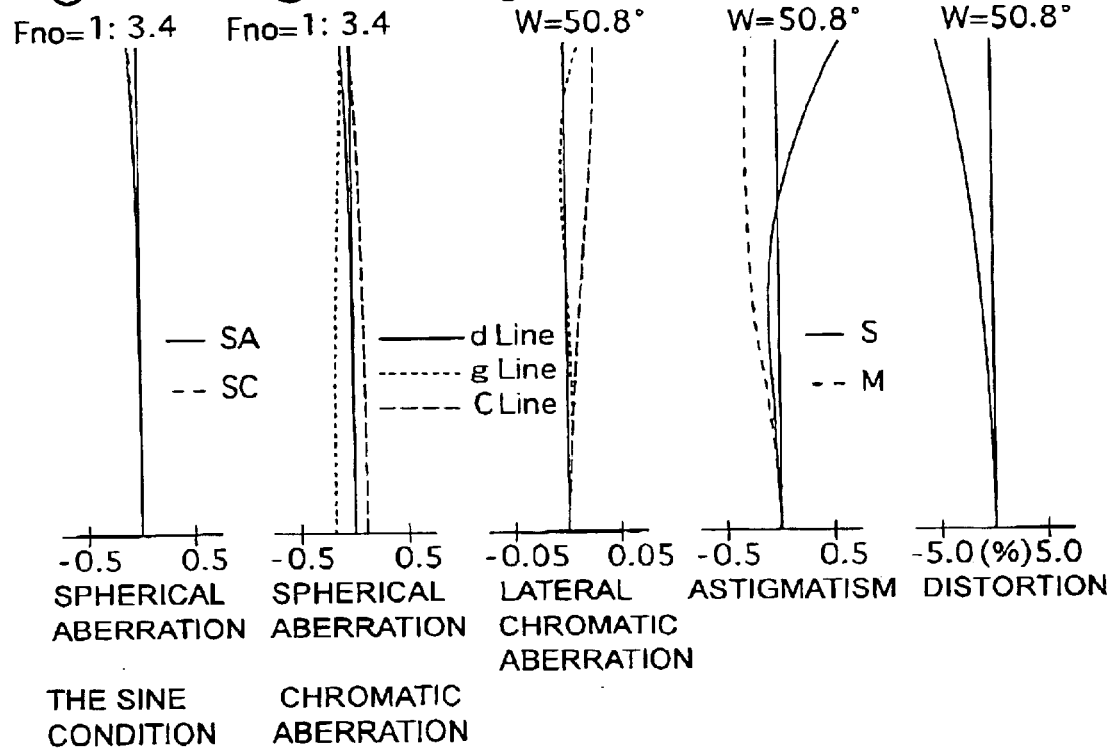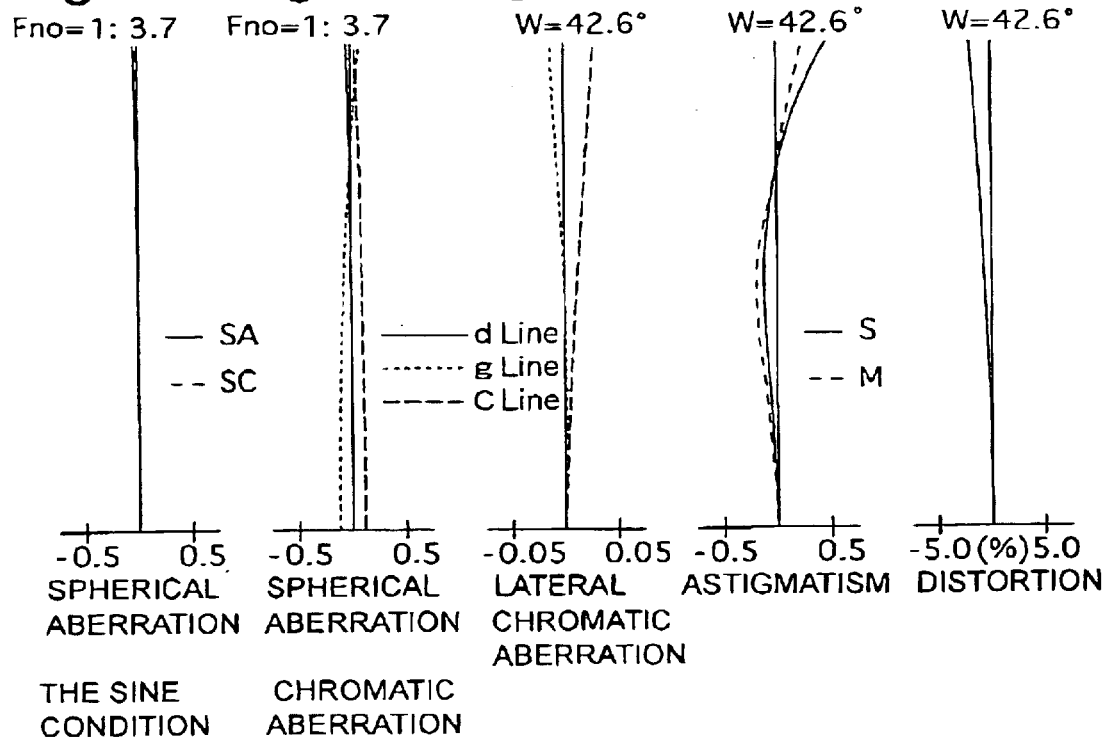

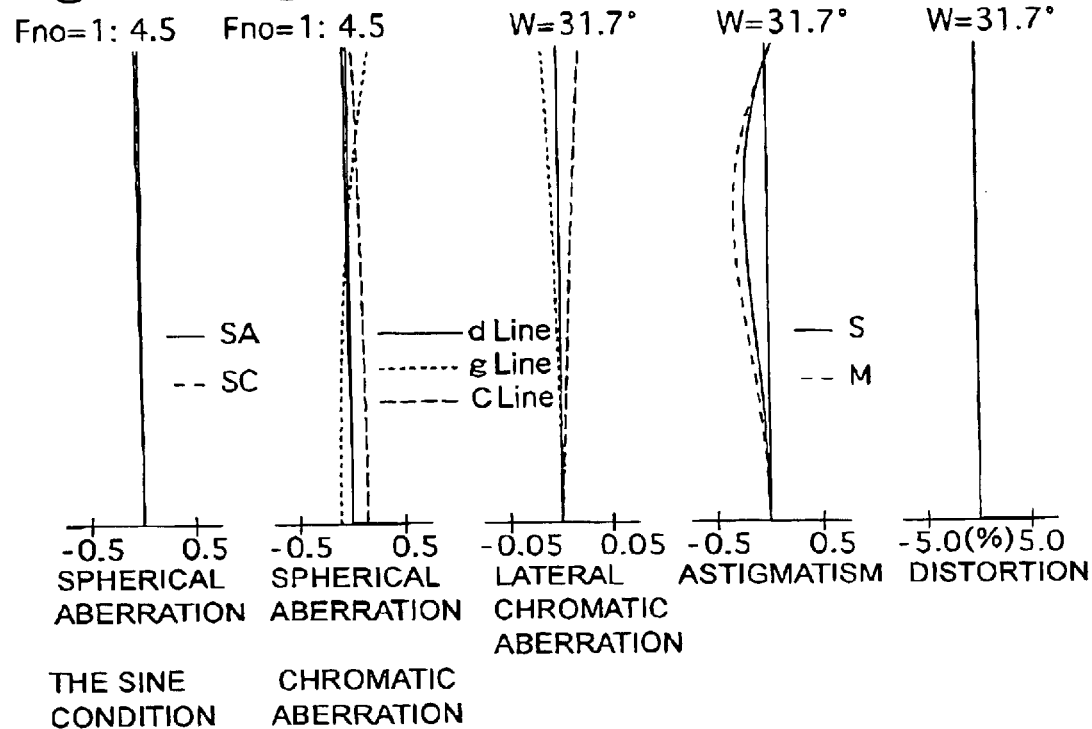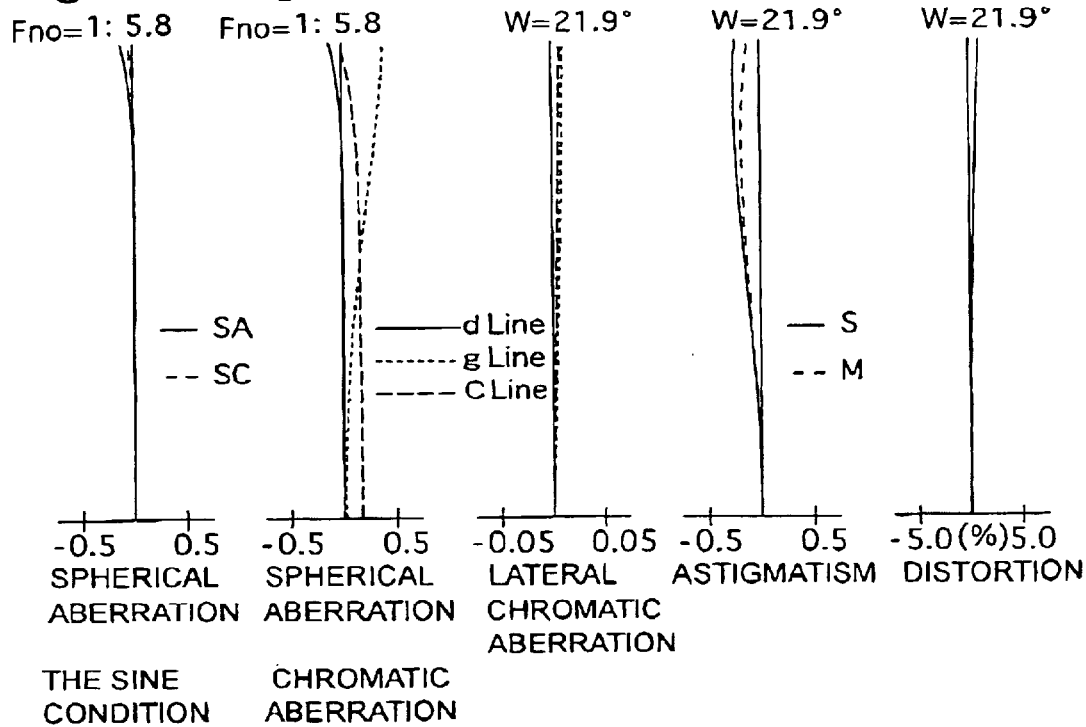

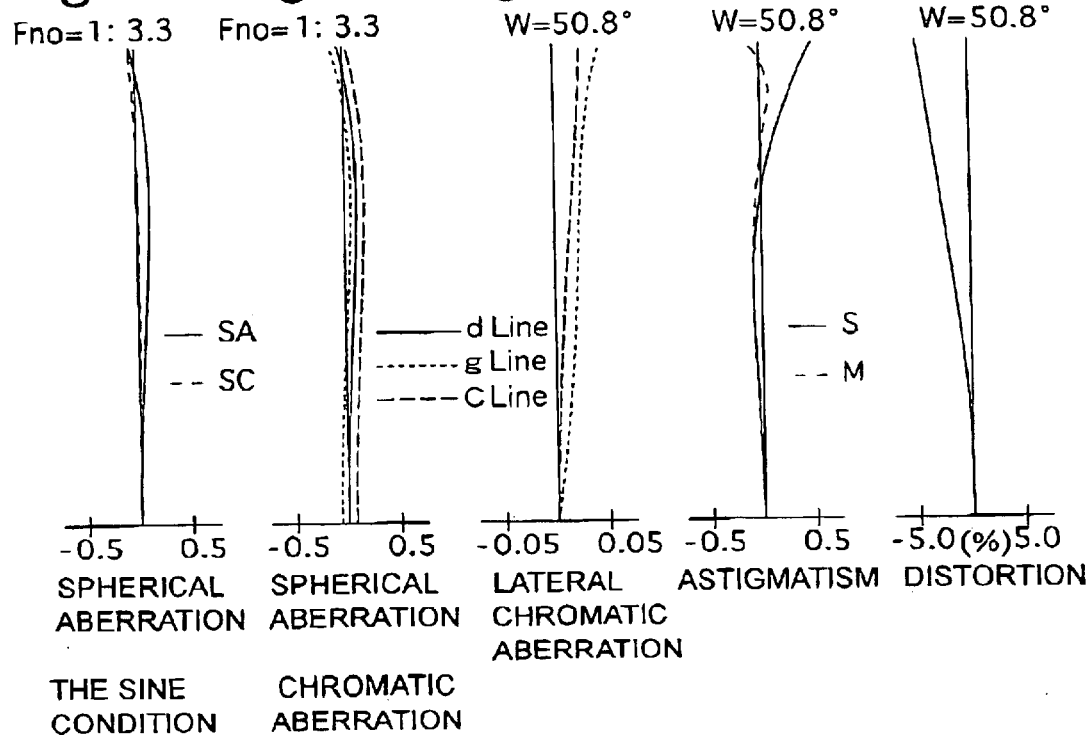
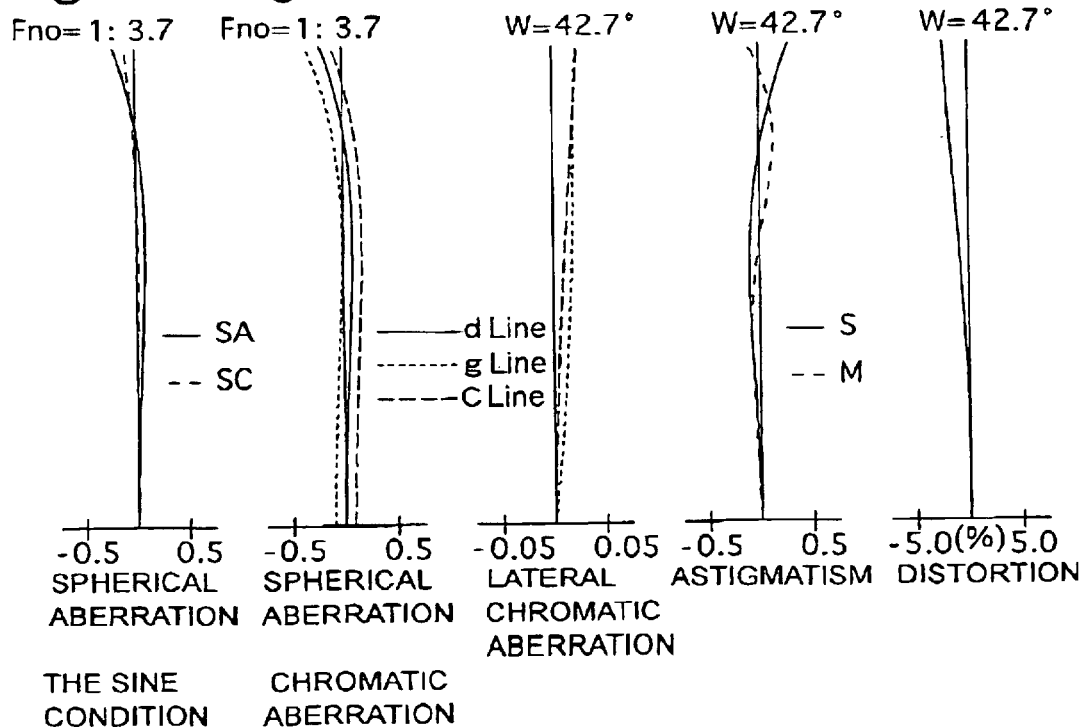

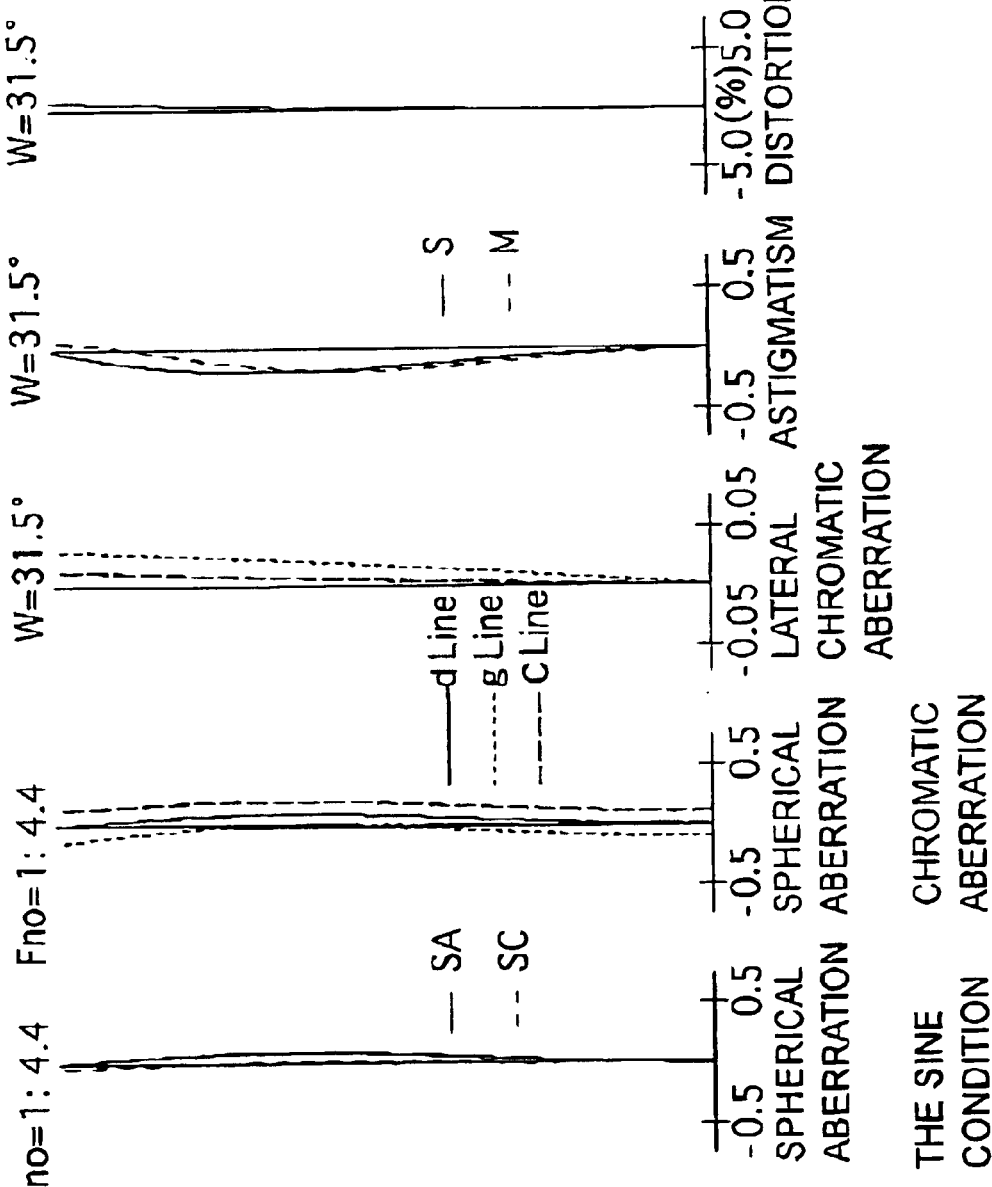

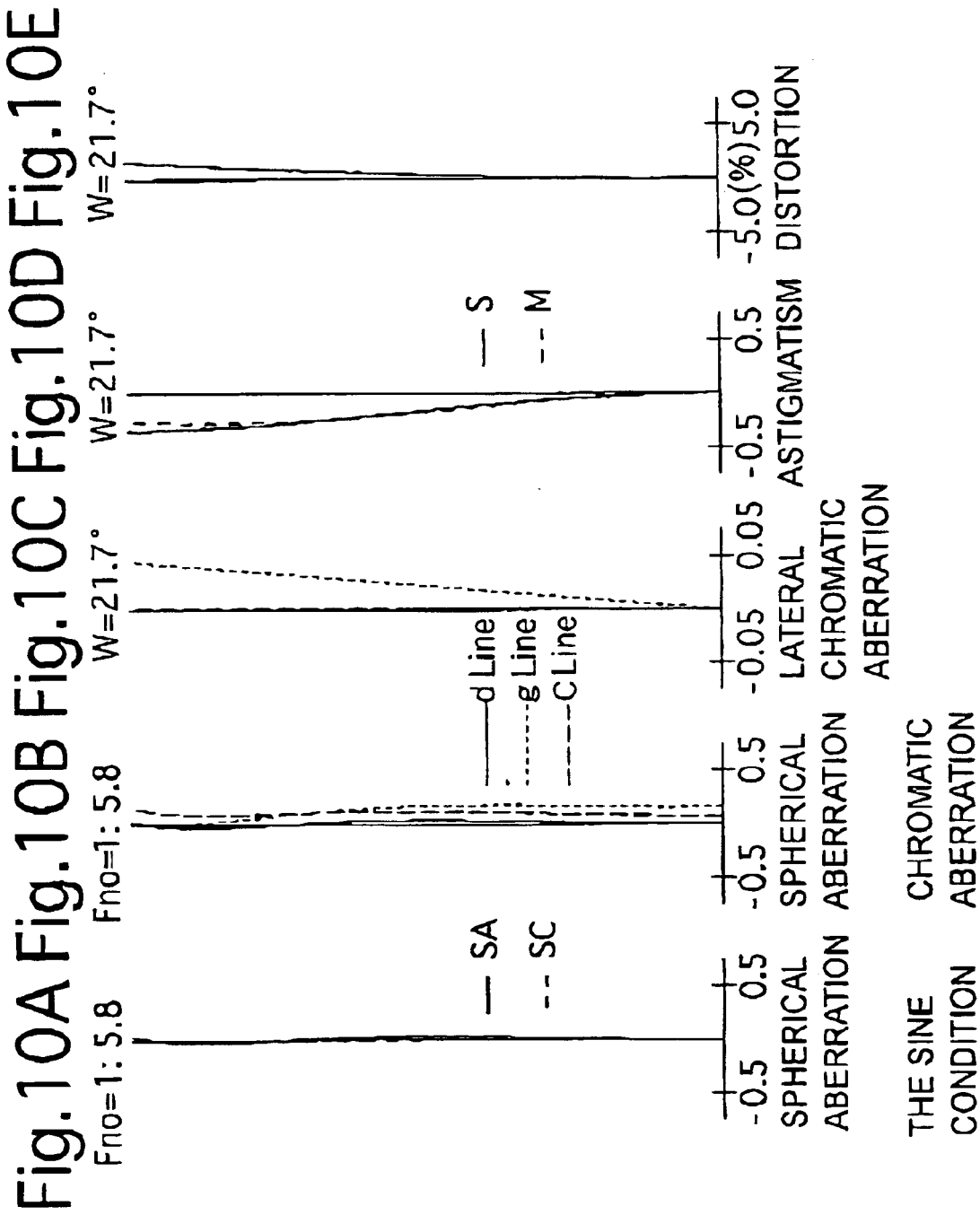

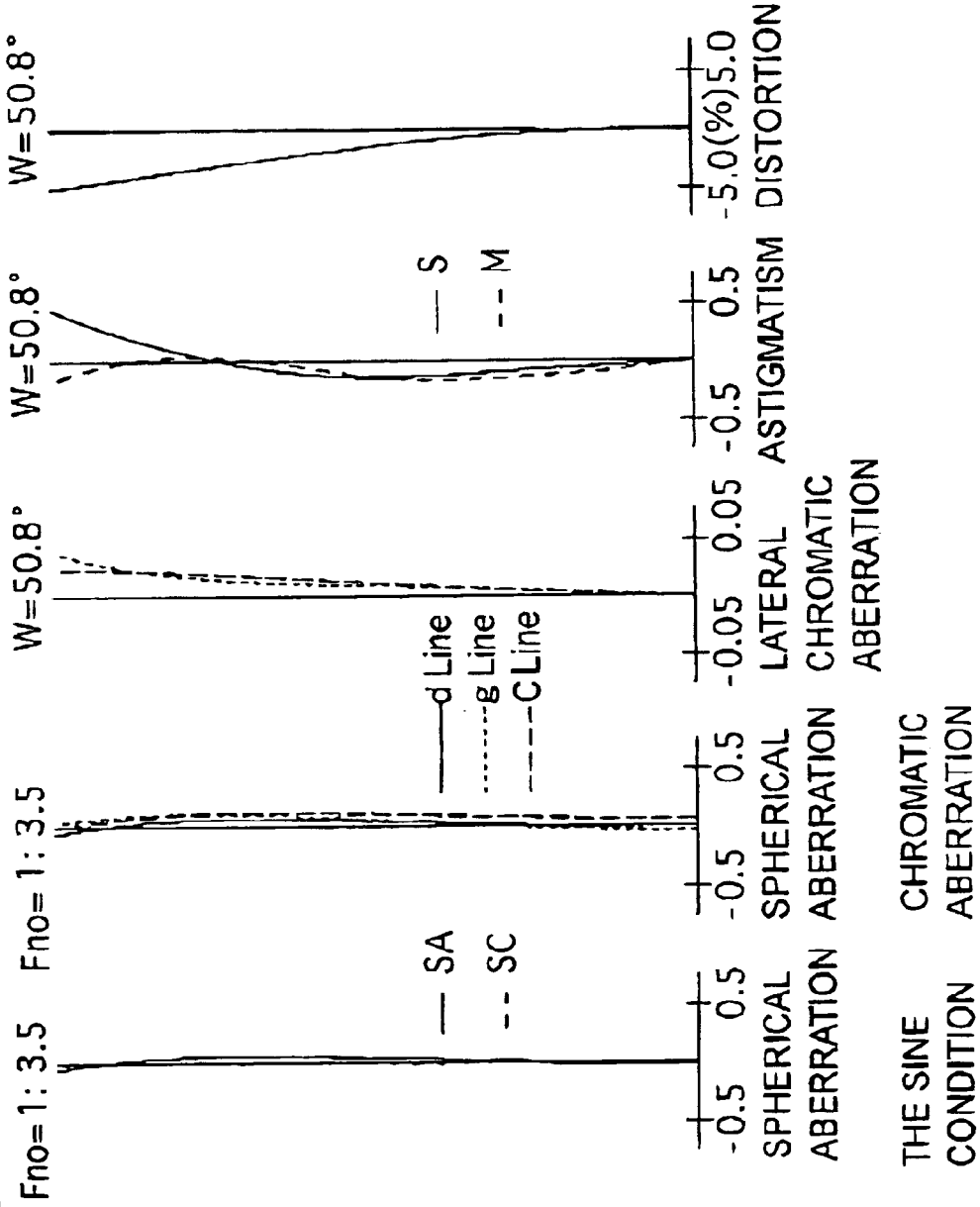

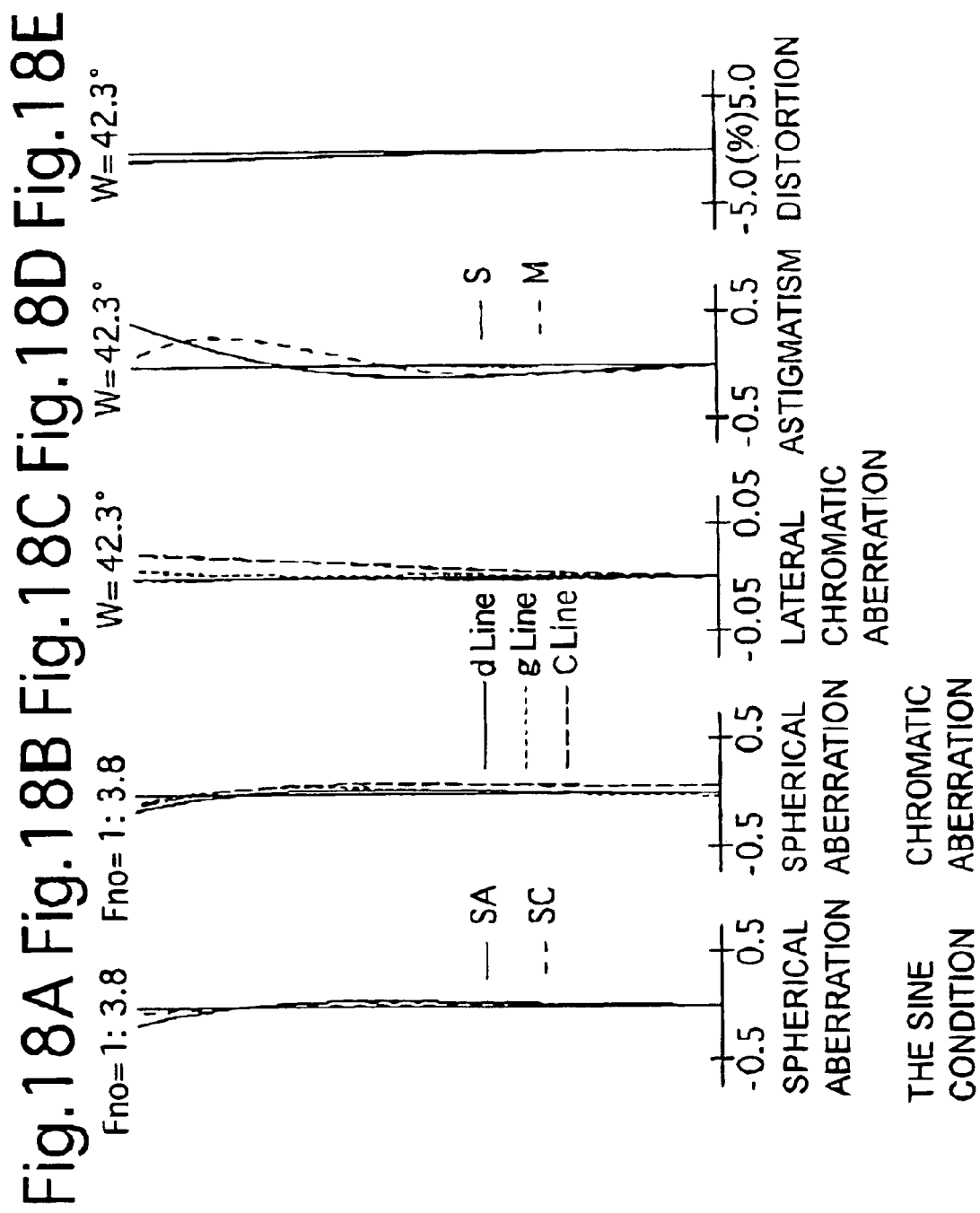

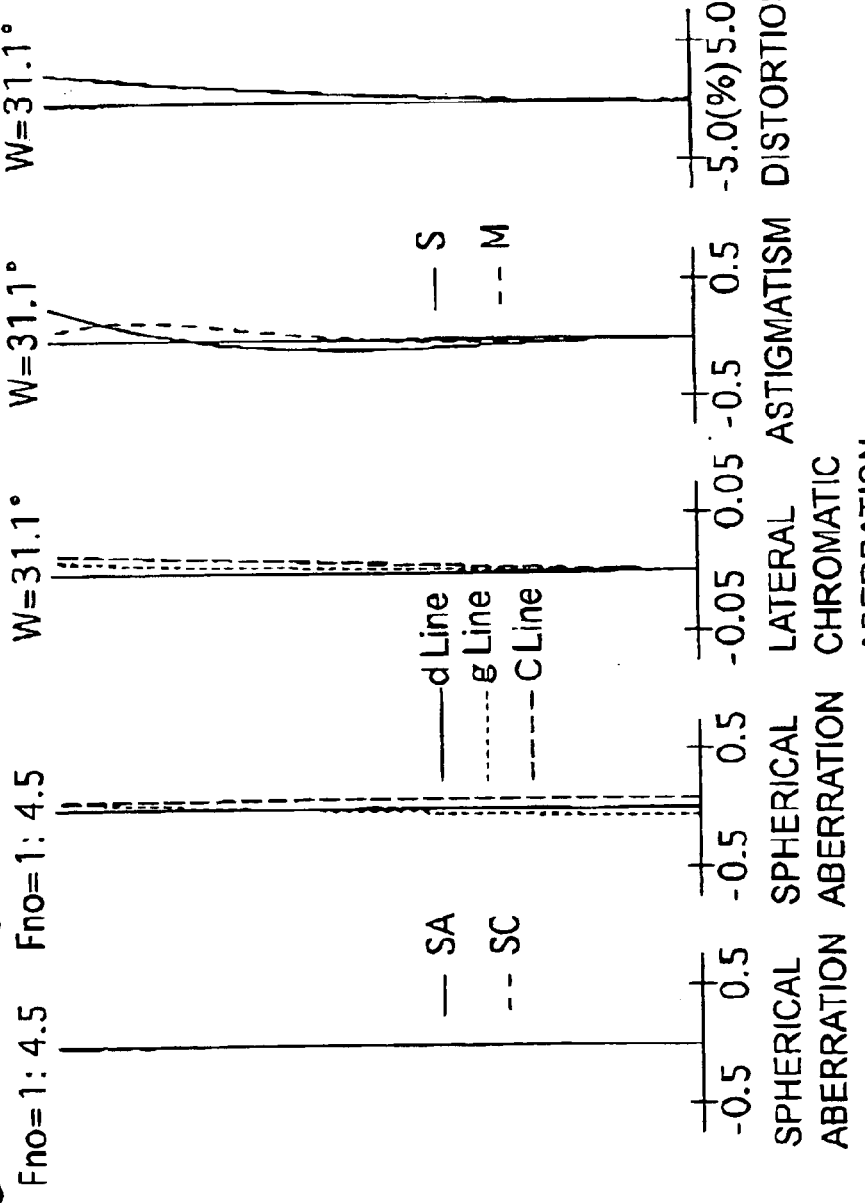

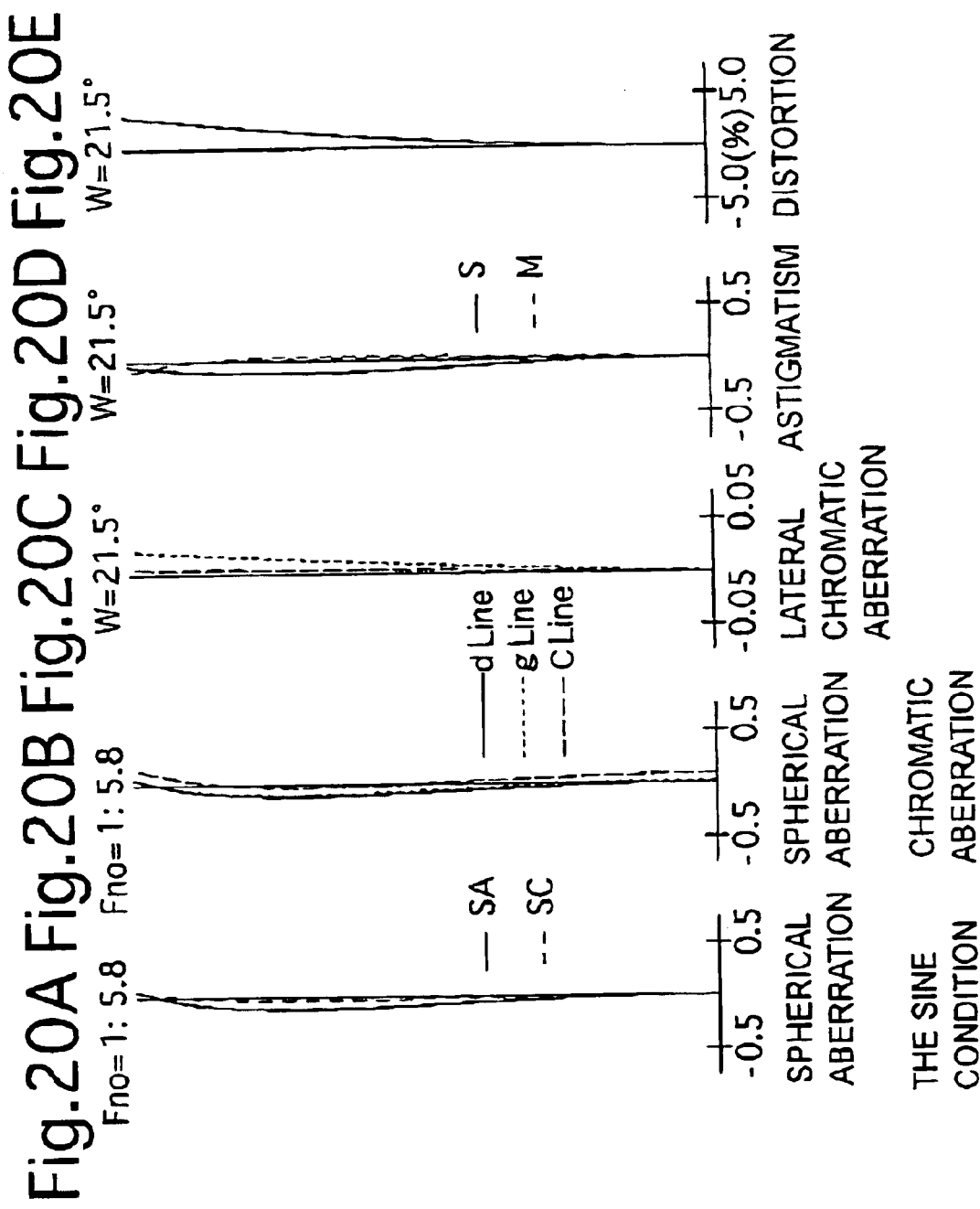

WIDE-ANGLE ZOOM LENS SYSTEM

BACKGROUND OF THE INVENTION

1. Field of the Invention

The present invention relates to a wide-angle zoom lens system which has a large-angle-of-view at the short focal length extremity, and which is suitable for a photographing lens system in a camera or a movie camera, etc.

2. Description of the Prior Art

In the prior art, as a zoom lens system attempting to achieve a wider angle-of-view at the short focal length extremity, such a zoom lens system has been disclosed, for example, in Japanese Unexamined Patent Publication (hereinafter, JUPP) No.2000-131611. However, in JUPP No. 2000-131611, the half angle-of-view at the short focal length extremity is 48γ, so that the wide angle-of-view is not sufficiently achieved at the short focal length extremity.

Furthermore, in JUPP No.2002-242336, proposed by the inventor of the present invention, the angle-of-view at the short focal length extremity has been made wider than that of JUPP No. 2000-131611; however, the zoom ratio is approximately 2. Therefore a higher zoom ratio has yet been required.

Still further, in the case of a wide-angle zoom lens system of a five-lens-group arrangement like the zoom lens system of the present invention, such a wide-angle zoom lens system has been proposed in, e.g., JUPP Nos. Hei-7-306362, Hei-9-0.230242, and 2000-292701.

In JUPP No. Hei-7-306362, the zoom ratio is as high as 3.75; however, the angle-of-view at the short focal length extremity is not sufficiently larger.

In JUPP No. Hei-9-230242, the zoom ratio is 2.75, which is also high; however, the angle-of-view at the short focal length extremity is not sufficiently larger.

The zoom lens system, disclosed in JUPP No. 2000-292701, is to be used in a projector; and the angle-of-view at the short focal length extremity is not sufficiently larger. Moreover, the overall length of the zoom lens system is fixed (not variable), and is not suitable for a photographing lens to which miniaturization is required for portability.

SUMMARY OF THE INVENTION

The present invention provides a wide-angle zoom lens system in which (i) the angle-of-view of at the short focal length extremity is more than 100γ, (ii) a zoom ratio is approximately 2.9, and (iii) the diameter of lens elements is smaller.

According to an aspect of the present invention, there is provided a wide-angle zoom lens system including a first lens group having a negative refractive power (hereinafter, a negative first lens group), a second lens group having a positive refractive power (hereinafter, a positive second lens group), a third lens group having a positive refractive power (hereinafter, a positive third lens group), a fourth lens group having a negative refractive power (hereinafter, a negative fourth lens group), and a fifth lens group having a positive refractive power (hereinafter, a positive fifth lens group), in this order from the object.

Upon zooming from the short focal length extremity to the long focal length extremity, the negative first lens group first moves toward the image and thereafter moves toward the object; the distance between the negative first lens group and the positive second lens group decreases, the distance between the positive second lens group and the positive third lens group decreases, the distance between the positive third lens group and the negative fourth lens group increases, and the distance between the negative fourth lens group and the positive fifth lens group decreases.

The wide-angle zoom lens system satisfies the following condition:

$$0.3 < dL_{1-2}/d_{2-3} < 5.0 \quad (1)$$

wherein $dL_{1-2}$ designates the difference in the distance between the negative first lens group and the positive second lens group at the short focal length extremity and the distance therebetween at the long focal length extremity; and $dL_{2-3}$ designates the difference in the distance between the positive second lens group and the positive third lens group at the short focal length extremity and the distance therebetween at the long focal length extremity.

The wide-angle zoom lens system preferably satisfies the following condition:

$$2.1 < (L_{1-2} + L_{2-3})/fw < 5.5 \quad (2)$$

wherein $L_{1-2}$ designates the distance between the negative first lens group and the positive second lens group at the short focal length extremity;

$L_{2-3}$ designates the distance between the positive second lens group and the positive third lens group at the short focal length extremity; and fw designates the focal length of the entire wide-angle zoom lens system at the short focal length extremity.

If an attempt is made to integrally move the positive third lens group and the positive fifth lens group upon zooming, the mechanism of the wide-angle zoom lens system can easily be established.

The wide-angle zoom lens system can satisfy the following condition:

$$1.7 < d_{X3}/fw < 4.0 \quad (3)$$

wherein $d_{X3}$ designates the traveling distance of the positive third lens group from the short focal length extremity to the long focal length extremity. Note that the direction toward the object is defined as the positive direction.

If an attempt is made to linearly move the positive third lens group and the negative fourth lens group upon zooming, the mechanism of the wide-angle zoom lens system can easily be established.

The negative first lens group preferably includes a negative first meniscus lens element having the convex surface facing toward the object, a negative second meniscus lens element having the convex surface facing toward the object, and a third meniscus lens element having the convex surface facing toward the object, in this order from the object. The third meniscus lens element is made of resin.

The negative first lens group satisfies the following condition:

$$|f1/f_{L3}| < 0.2 \quad (4)$$

wherein f1 designates the focal length of the negative first lens group; and $f_{L3}$ designates the focal length of the third meniscus lens element in the negative first lens group.

The wide-angle zoom lens system preferably satisfies the following condition:

$$0.2 < fw/f3 < 0.9 \quad (5)$$

wherein f3 designates the focal length of the positive third lens group.

The wide-angle zoom lens system preferably satisfies the following condition:

$$-0.6 < fw/f4 < -0.1 \quad (6)$$

wherein f4 designates the focal length of the negative fourth lens group.

The present disclosure relates to subject matter contained in Japanese Patent Application No.2003-027946 (filed on Feb. 5, 2003) which is expressly incorporated herein in its entirety.

BRIEF DESCRIPTION OF THE DRAWINGS

The present invention will be discussed below in detail with reference to the accompanying drawings, in which:

FIGS. 2A, 2B, 2C, 2D and 2E show aberrations occurred in the lens arrangement shown in FIG. 1;

FIGS. 3A, 3B, 3C, 3D and 3E show aberrations occurred in the lens arrangement shown in FIG. 1 at an intermediate focal length on the side of the shorter focal length;

FIGS. 4A, 4B, 4C, 4D and 4E show aberrations occurred in the lens arrangement shown in FIG. 1 at an intermediate focal length on the side of the longer focal length;

FIGS. 5A, 5B, 5C, 5D and 5E show aberrations occurred in the lens arrangement shown in FIG. 1 at the long focal length extremity;

FIGS. 7A, 7B, 7C, 7D and 7E show aberrations occurred in the lens arrangement shown in FIG. 6; FIGS. 8A, BB, 8C, 8D and 8E show aberrations occurred in the lens arrangement shown in FIG. 6 at an intermediate focal length on the side of the shorter focal length;

FIGS. 9A, 9B, 9C, 9D and 9E show aberrations occurred in the lens arrangement shown in FIG. 6 at an intermediate focal length on the side of the longer focal length;

FIGS. 10A, 10B, 10C, 10D and 10E show aberrations occurred in the lens arrangement shown in FIG. 6 at the long focal length extremity;

Figure 11:
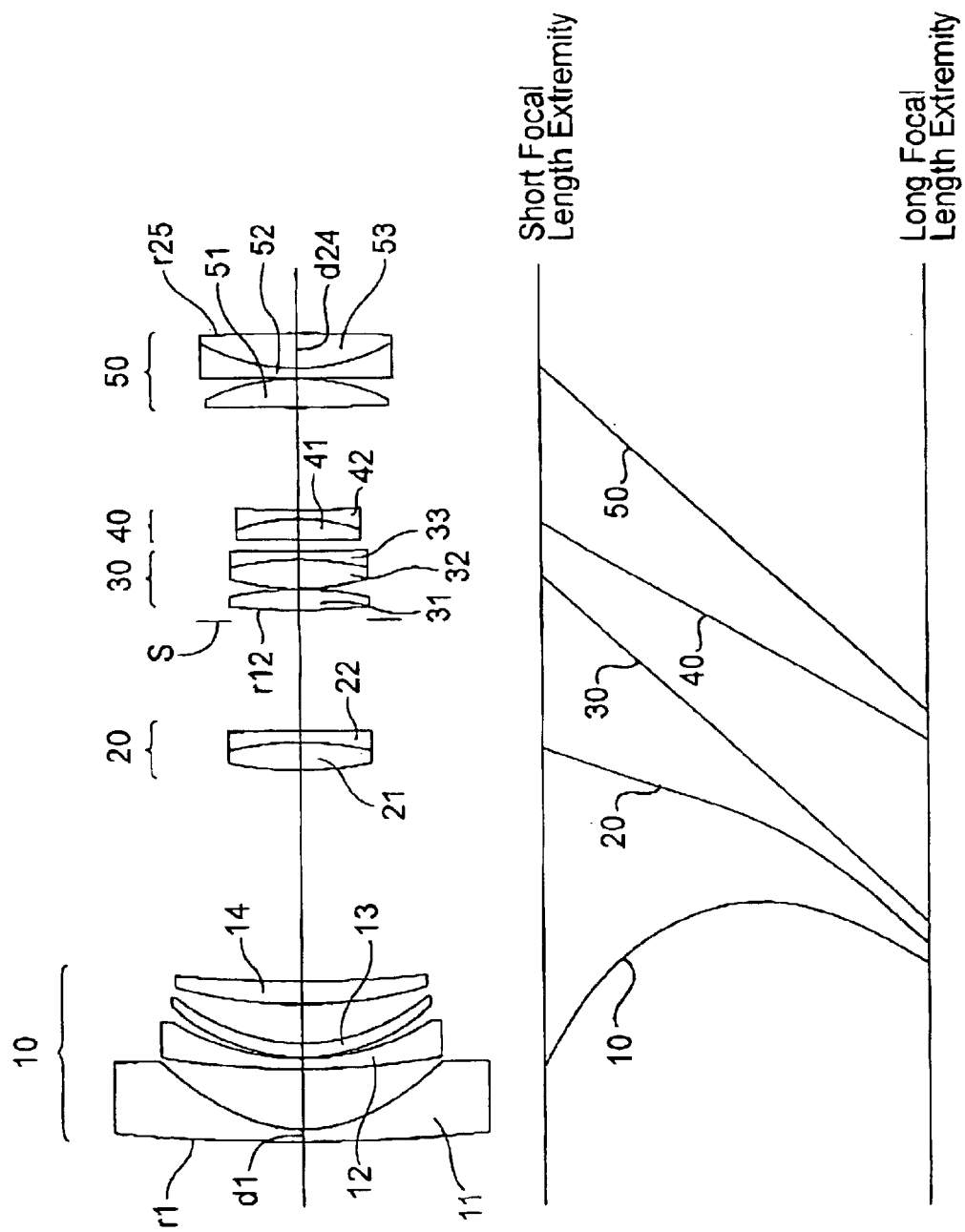
FIG. 11 is a lens arrangement of the wide-angel zoom lens system at the short focal length extremity, according to a third embodiment of the present invention.
Figure 12:
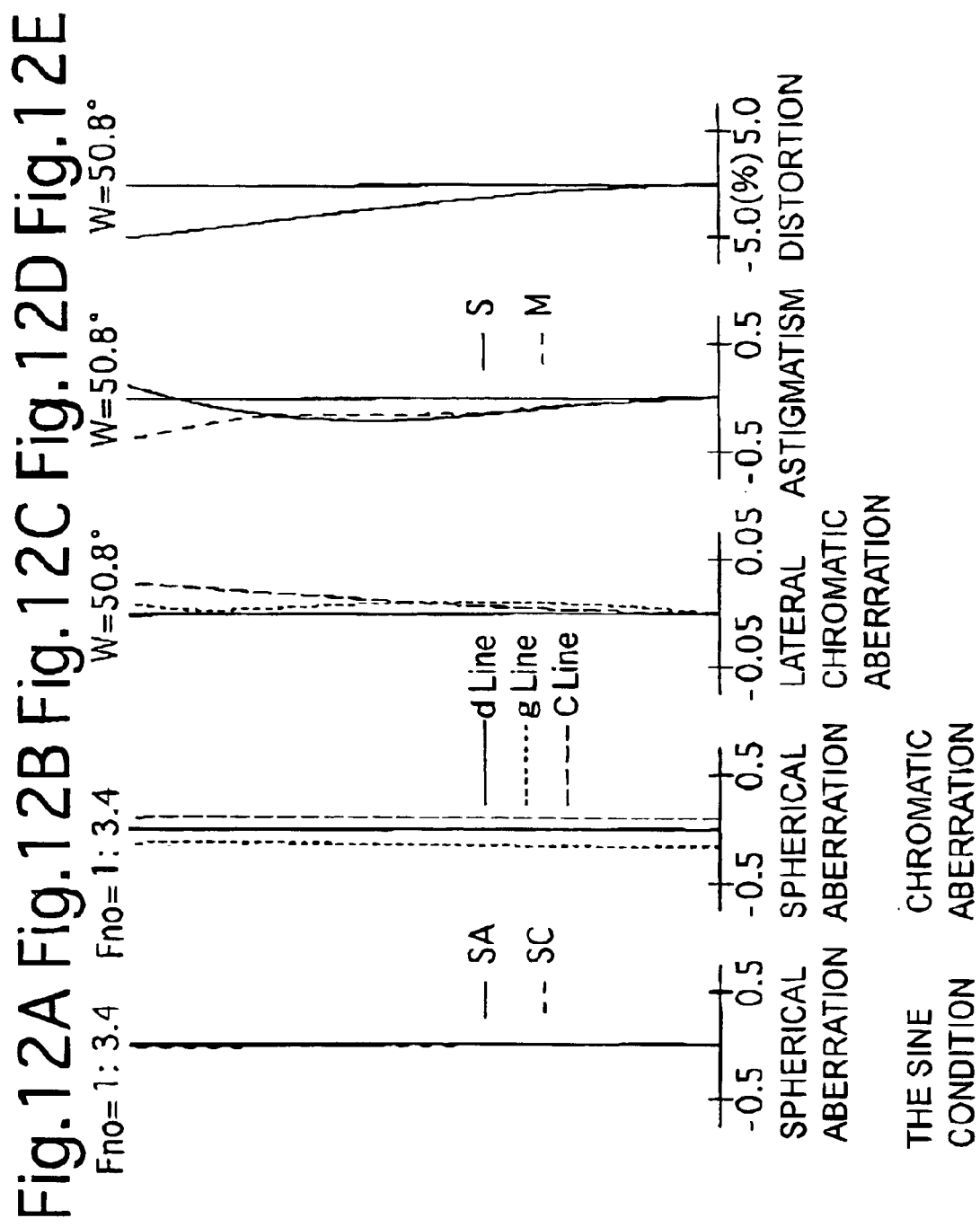
FIGS. 12A, 12B, 12C, 12D and 12E show aberrations occurred in the lens arrangement shown in FIG. 11.
Figure 13:
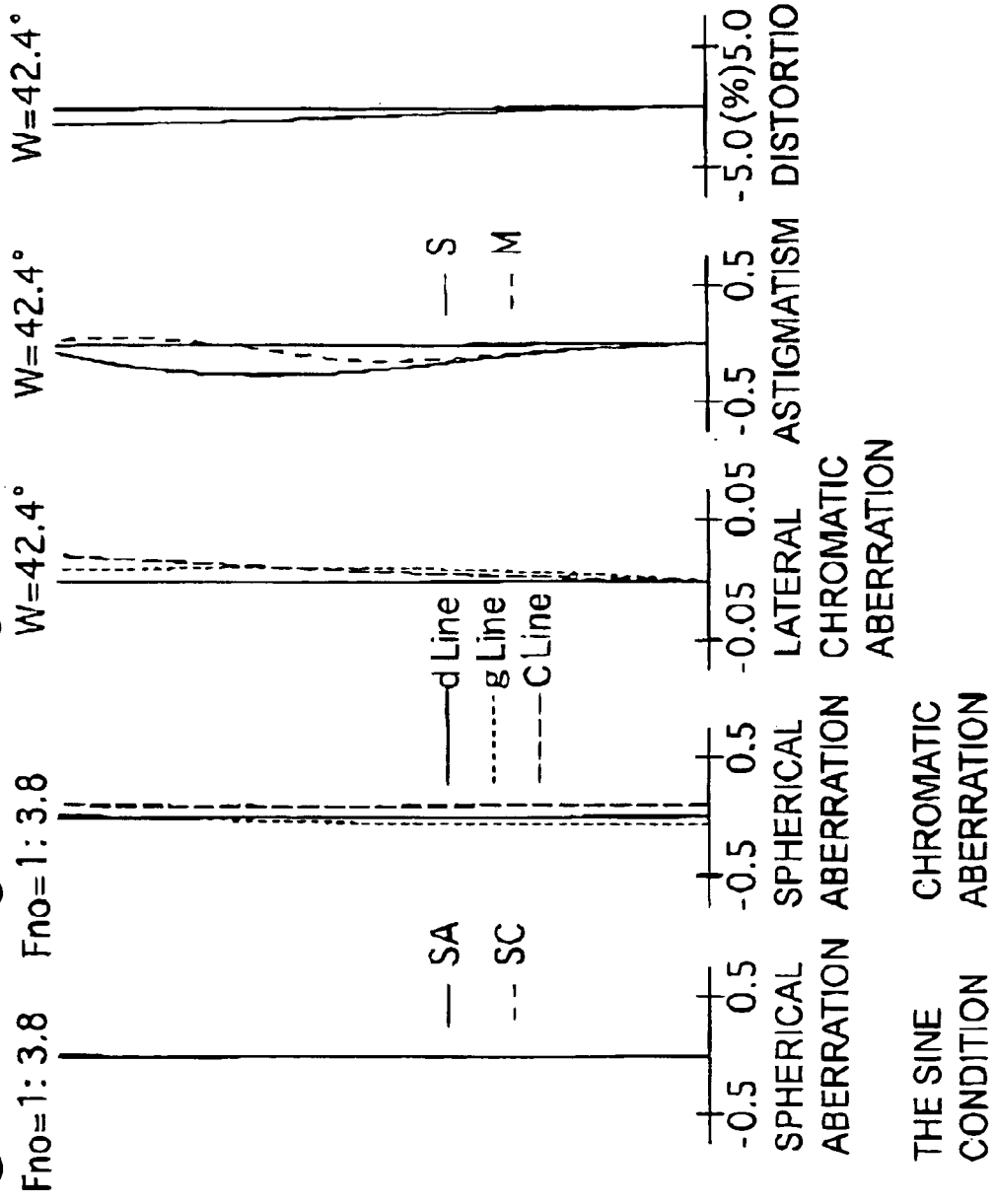
FIGS. 13A, 13B, 13C, 13D and 13E show aberrations occurred in the lens arrangement shown in FIG. 11 at an intermediate focal length on the side of the shorter focal length.
Figure 14:
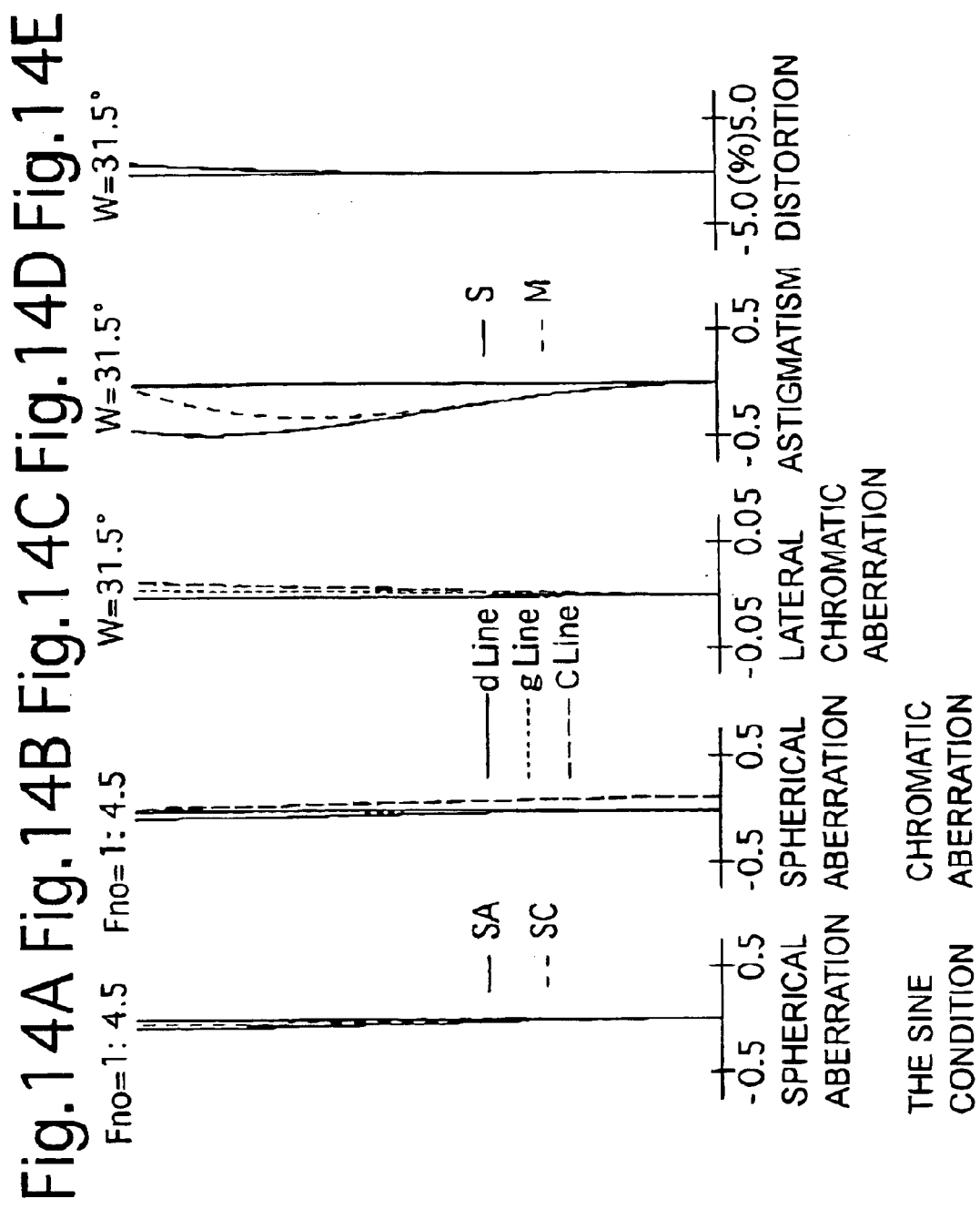
FIGS. 14A, 14B, 14C, 14D and 14E show aberrations occurred in the lens arrangement shown in FIG. 11 at an intermediate focal length on the side of the longer focal length.
Figure 15:
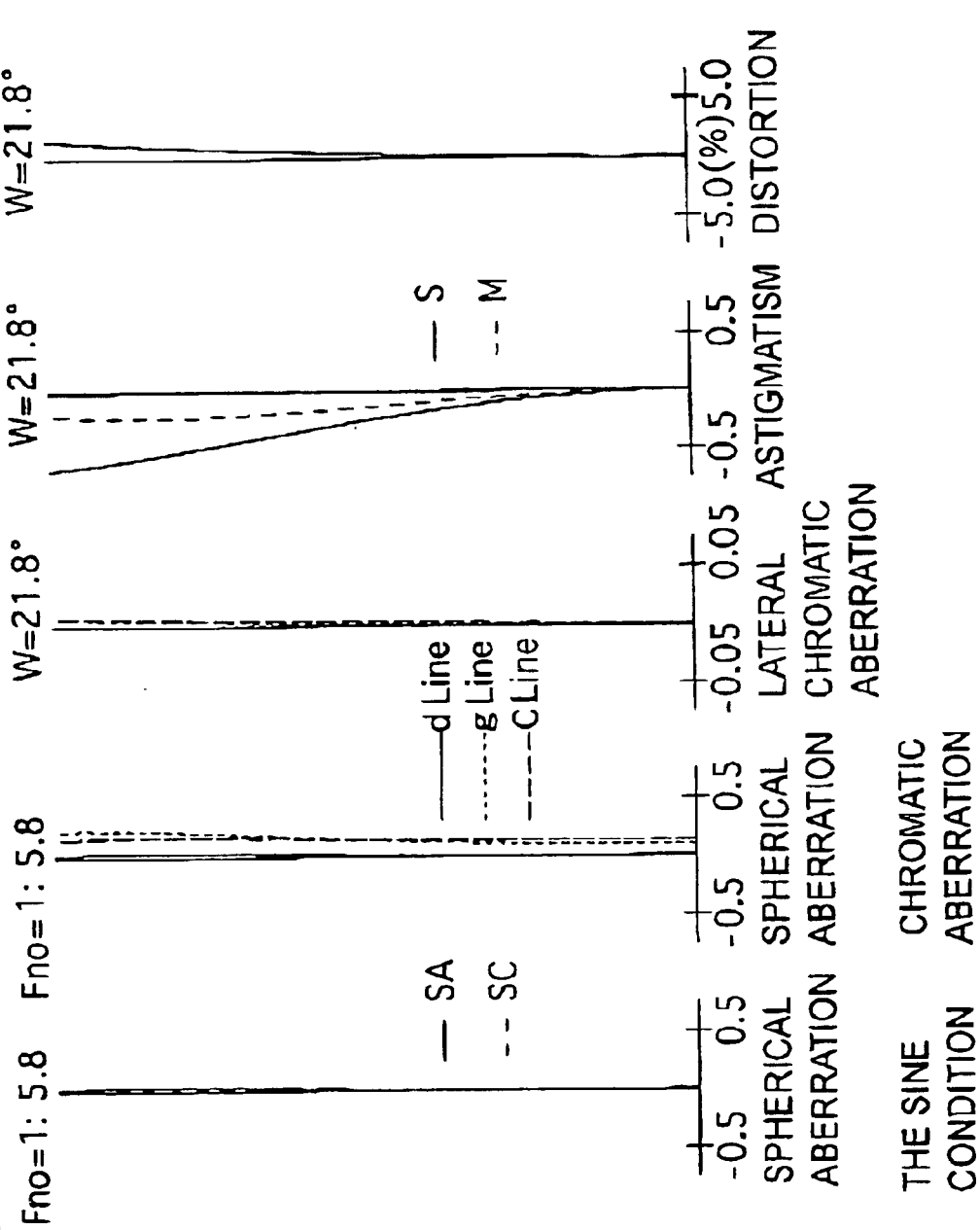
Figure 16:
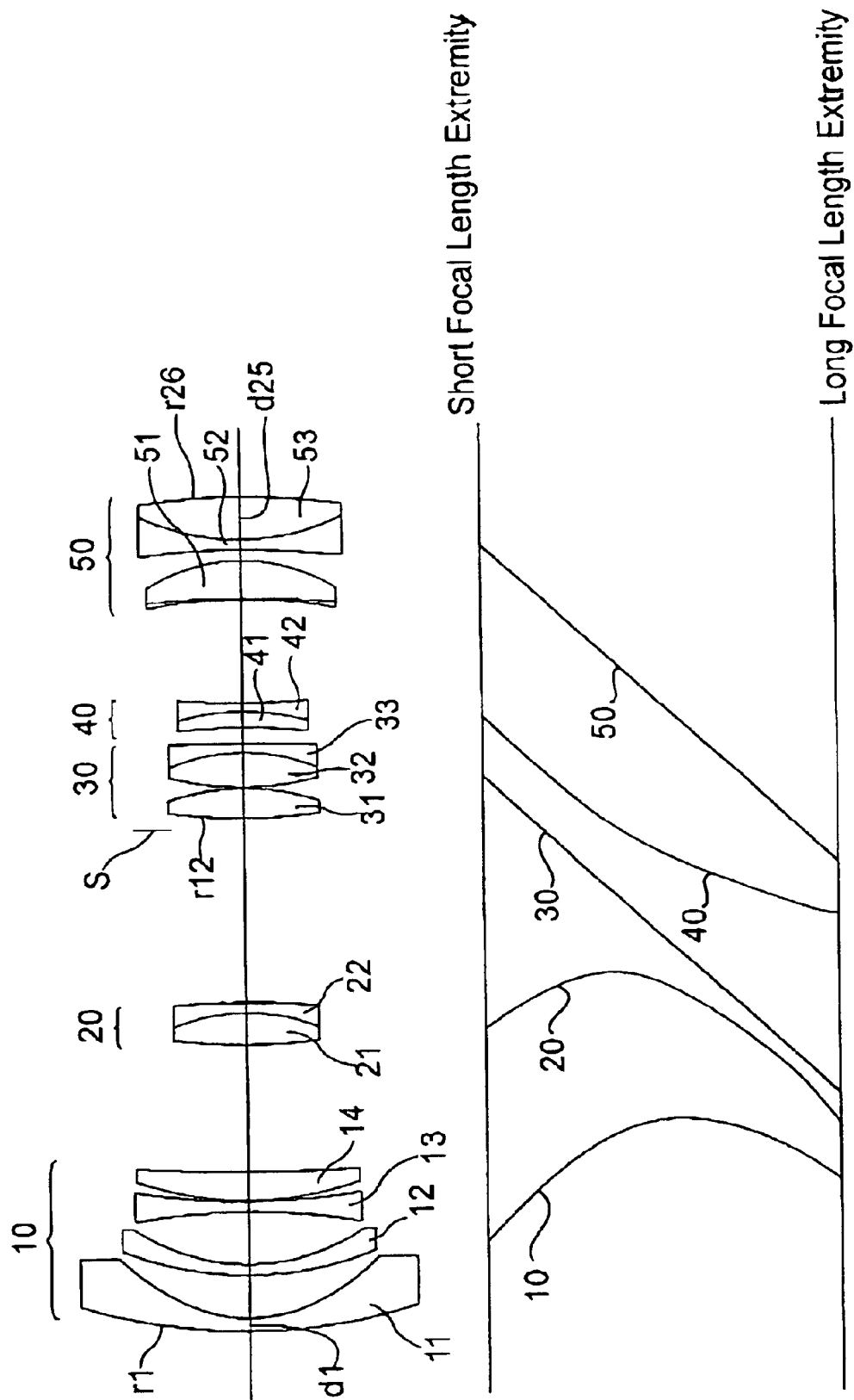

Figures ISA, 15B, 15C, 15D and 15E show aberrations occurred in the lens arrangement shown in FIG. 11 at the long focal length extremity;

FIG. 16 is a lens arrangement of the wide-angel zoom lens system at the short focal length extremity, according to a fourth embodiment of the present invention;

FIGS. 17A, 17B, 17C, 17D and 17E show aberrations occurred in the lens arrangement shown in FIG. 16;

FIGS. 18A, 18B, 18C, 18D and 18E show aberrations occurred in the lens arrangement shown in FIG. 16 at an intermediate focal length on the side of the shorter focal length;

FIGS. 19A, 19B, 19C, 19D and 19E show aberrations occurred in the lens arrangement shown in FIG. 16 at an intermediate focal length on the side of the longer focal length; and FIGS. 20A, 20B, 20C, 20D and 20E show aberrations occurred in the lens arrangement shown in FIG. 16 at the long focal length extremity.

DESCRIPTION OF THE PREFERRED EMBODIMENTS

As shown in the embodiments of FIGS. 1, 6, 11 and 16, the wide-angle zoom lens system according to the present invention includes a negative first lens group 10, a positive second lens group 20, a positive third lens group 30, a negative fourth lens group 40 and a positive fifth lens group 50, in this order from the object.

As shown in the lower portion in each of FIGS. 1, 6, 11 and 16, upon zooming from the short focal length extremity (S) to the long focal length extremity (L), the negative first lens group 10 first moves toward the image and then moves toward the object; the distance between the negative first lens group 10 and the positive second lens group 20 decreases, the distance between the positive second lens group 20 and the positive third lens group 30 decreases, the distance between the positive third lens group 30 and the negative fourth lens group 40 increases, and the distance between the negative fourth lens group 40 and the positive fifth lens group 50 decreases.

A diaphragm S is provided in front of the positive third lens group 30 (on the object side), and moves together with the positive third lens group 30.

In a photographing optical system utilized in an SLR camera, a video camera, or a digital still camera, etc., if an attempt is made to achieve a zoom lens system in which the angle-of-view at the short focal length extremity is larger, it is common practice to distribute the refractive power in the zoom lens system so that the negative refractive power is given to a front lens group (a lens group on the side of the object: a negative-precede type) and the positive refractive power is given to a rear lens group (a lens group on the side of the image) for the purpose of securing a space (i.e., providing a long back focal distance) for filters, a quick-return mirror, or a prism on the side of the image plane.

In order to largely increase the zoom ratio of the above negative-precede type wide-angle zoom lens system, there is a need to secure a longer traveling distance of the subsequent (positive) rear lens group. On the other hand, it should be noted that a mere increase of the traveling distance thereof makes the height of off-axis light rays passing through the peripheral portion of the (negative) front lens group higher, as the angle-of-view at the short focal length extremity becomes larger. Consequently, the diameter of the (negative) front lens group becomes larger. Moreover, a filter is usually mounted immediately in front of the photographing lens system. As a result, an increase of the diameter of the (negative) front lens group inevitably makes even the size of an accessory, such as a filter, larger.

Accordingly, in the present invention, in order to reduce the diameter of the negative first lens group 10 (the front lens group), a positive lens group (the second lens group 20) is provided between the negative first lens group 10 and the subsequent positive lens group (i.e., the combination of the positive third lens group 30, the negative fourth lens group 40, and the positive fifth lens group 50), so that the height of the off-axis light rays passing through the negative first lens group 10 is reduced.

Condition (1) is for appropriately positioning the positive second lens group 20 at the short focal length extremity and the long focal length extremity, respectively.

If $dL_{1-2}/dL_2$ exceeds the lower limit of condition (1), the height of the off-axis light rays passing through the negative first lens group 10 becomes too low, so that peripheral illumination cannot be secured.

If $dL_{1-2}/dL_2$ exceeds the upper limit of condition (1), the amount of peripheral illumination increases; however, the height of the off-axis light rays passing through the negative first lens group 10 becomes higher. Consequently, the diameter of the negative first lens group 10 cannot be made smaller.

Condition (2) specifies the sum of the distance between the negative first lens group 10 and the positive second lens group 20, and the distance between the positive second lens group 20 and the positive third lens group 30, and indirectly secures the traveling distances of the lens groups behind the positive third lens groups 30.

If the sum of the above-mentioned distances becomes smaller to the extent that $(L_{1-2}+L_{2-3}/fw$ exceeds the lower limit of condition (2), the traveling distances of the lens groups behind the positive third lens group 30 cannot be secured. As a result, an adequate zoom ratio cannot be secured.

If the sum of the above-mentioned distances becomes larger to the extent that $(L_{1-2}+L_{2-3}/fw$ exceeds the upper limit of condition (2), the traveling distances of the lens groups behind the positive third lens group 30 can be secured. However, the overall length of the wide-angle zoom lens system becomes longer, and peripheral illumination cannot be secured.

Condition (3) specifies the traveling distance of the positive third lens group 30 for the purpose of achieving a higher zoom ratio. More concretely, Condition (3) is to specify the traveling distance of the positive third lens group 30 under the condition that the positive third lens group 30 is considered to be the most object-side lens group in the above-mentioned subsequent positive lens group(i.e., the combination of the positive third lens group 30, the negative fourth lens group 40, and the positive fifth lens group 50).

If the traveling distance of the positive third lens group 30 becomes shorter to the extent that $d_{x3}/fw$ exceeds the lower limit of condition (3), the refractive power of the positive third lens group 30 to the positive fifth lens group 50 has to be made stronger for securing the zoom ratio. Consequently, aberrations increase, and optical performance cannot be maintained.

If the traveling distance of the positive third lens group 30 becomes longer to the extent that $d_{x3}/fw$ exceeds the upper limit of condition (3), it is advantageous for achieving a higher zoom ratio; however, the overall length of the wide-angle zoom lens system becomes longer, and the amount of peripheral illumination decreases.

In the wide-angle zoom lens system of the present invention, upon zooming, the distance between the positive third lens group 30 and the negative fourth lens group 40 is arranged to increase, and the distance between the negative fourth lens group 40 and the positive fifth lens group 50 is arranged to decrease. This movement of the lens groups provides an effect similar to one which can be obtained from an inner-focusing type lens system. Due to the above arrangement, an effect of zooming by the movement of the positive third lens group 30 to the positive fifth lens group 50 is enhanced, so that a higher zoom ration can be obtained.

In this case, if the positive third lens group 30 and the positive fifth lens group 50 are arranged to integrally move, the cam mechanism of the wide-angle zoom lens system can be simplified, and an error due to decentration can advantageously be reduced.

Particularly, in the wide-angle zoom lens system of the present invention, the bundle of light rays which is diverged from the negative first lens group 10 is collected by the positive third lens group 30 through the positive fifth lens group 50 which have a stronger refractive power than the negative first lens group 10 does, so that error sensitivity becomes high. If the positive third lens group 30 and the positive fifth lens group 50 are made integral, i.e., made structurally rigid, occurrence of an error due to decentration can be reduced.

In addition to the integral movement of the positive third lens group 30 and the positive fifth lens group 50, if the positive third lens group 30, the negative fourth lens group 40 and the positive fifth lens group 50 are arranged to move linearly, the mechanism of the wide-angle zoom lens system can further be simplified, and the weight and cost of the wide-angle zoom lens system can be advantageously reduced.

In the embodiments of the present invention, for the purpose of achieving (i) an angle-of-view of more than 100γ at the short focal length extremity, and (ii) a longer back focal distance, a strong negative refractive power is necessary in the first lens group 10. Specifically, in order to distribute the strong negative refractive power over a plurality of glass lens elements, of the negative first lens group 10, having high refractive indexes, the negative first lens group 10 generally includes a negative first meniscus lens element having the convex surface facing toward the object, a negative second meniscus lens element having the convex surface facing toward the object, a negative third lens element (refer to the fourth embodiment discussed below), and a positive fourth lens element, in this order from the object. With the above arrangement, it is preferable that distortion occurred under a storing negative refractive power be corrected by the positive fourth lens element and aspherical surfaces provided on any of the diverging surfaces of the first through the third lens elements, e.g., the image-side concave surface of the negative first meniscus lens element (also refer to the fourth embodiments).

However, since the diameter of the negative first lens group 10 is relatively large, the manufacturing cost of the negative first lens group 10 made of high refractive glass becomes higher.

Furthermore, if an attempt is made to provide an aspherical surface on any of the lens surfaces, it would be possible to eliminate one negative lens element. However, the manufacturing costs of a glass-molded lens element and a hybrid lens element are extremely high. This is because, (i) a glass-molded lens element is made by heating a special optical glass, and by being press-molded with an aspherical-surface mold; and (ii) a hybrid lens element is made by bonding a thin resin aspherical-surface layer over a spherical glass lens element. Therefore an effect of cost-reduction by eliminating one glass lens element is almost nullified.

Here, if a glass lens element is replaced with a resin aspherical lens element which can easily be molded, a major cost-reduction is expected while the optical performance of the resin aspherical lens element can be maintained substantially the same as that of the glass lens element.

On the other hand, according to the above-explained arrangement of the negative first lens group 10, the negative and positive lens elements have strong refractive power, so that it is not practical to merely replace each of the above negative and positive lens elements with resin-molded lens elements. This is because a resin-molded lens element is vulnerable to environmental changes, such as the changes in temperature and humidity. Then, it is preferable that one negative lens element, which is made of optical glass and has a strong negative refractive power, be divided into one negative lens element made of optical glass, and one aspherical lens element which is made of resin and has an extremely weak power. According to this arrangement, a major cost-reduction can be made, while suitable optical performance is maintained even when one negative lens element made of optical glass is eliminated from the negative first lens group 10.

More specifically, as the third lens element, a positive meniscus lens element (refer to the first to third embodiments discussed below) having the convex surface facing toward the object can also be provided, instead of the negative third lens element (the fourth embodiment). Furthermore, in the case where the third positive meniscus lens element is formed as the aspherical meniscus lens element made of resin, it becomes possible to correct distortion with low cost.

Here, it goes without saying that optical performance can further be enhanced, if a negative lens element made of optical glass is incorporated in addition to the resin-molded aspherical third lens element satisfying Condition (4), though the cost will become higher (refer to the second embodiment discussed below).

Condition (4) specifies the refractive power of the above-explained third lens element.

If the absolute value of the refractive power becomes stronger to the extent that $|f1/f_{L3}|$ exceeds the (upper) limit of condition (4), an in-focus state and aberrations would undesirably be changed due to the environmental changes, such as a change in temperature, etc. Consequently, it becomes substantially impractical to make the third lens element from resin.

In the negative first lens group 10, the two negative lens elements on the side of the object are necessary to make the angle-of-view at the short focal length extremity larger, and to secure a longer back focal distance. However, distortion occurs in these two negative lens elements. Therefore if an attempt is made to reduce distortion under the condition that (i) the diameter of the negative first lens group 10 is maintained smaller, and (ii) the negative first lens group 10 is constituted by fewer lens elements, it is preferable that at least one surface of the two negative lens elements be provided with an aspherical surface.

Specifically, at least one surface mentioned above is preferably formed as a hybrid aspherical surface.

In addition, in the case where the third lens element is formed as a resin-molded aspherical lens element which has a weak refractive power so as to satisfy Condition (4), the negative first lens group 10 can be formed as an optical system which is inexpensive and maintains suitable optical performance.

Condition (5) specifies the refractive power of the positive third lens group 30.

If the refractive power of the positive third lens group 30 becomes weaker to the extent that fw/f3 exceeds the lower limit of condition (5), the overall length of the wide-angle zoom lens system becomes longer, so that the height of light rays incident on the negative fourth lens group 40 becomes higher. Consequently, spherical aberration in the positive direction occurs at the long focal length extremity.

If the refractive power of the positive third lens group 30 becomes stronger to the extent that fw/f3 exceeds the upper limit of condition (5), it is advantageous to reduce the overall length of the wide-angle zoom lens system; however, strong spherical aberration in the negative direction occurs, and, in particular, the balance of aberrations on the entire wide-angle zoom lens system cannot be maintained at the short focal length extremity.

Condition (6) specifies the refractive power of the negative fourth lens group 40.

If the refractive power of the negative fourth lens group 40 becomes weaker to the extent that fw/f4 exceeds the lower limit of condition (6), the traveling distance of the negative fourth lens group 40 becomes longer to obtain a higher zoom ratio, so that the size of the wide-angle zoom lens system becomes larger.

If the refractive power of the negative fourth lens group 40 becomes stronger to the extent that fw/f4 exceeds the upper limit of condition (6), the diameter of the positive fifth lens group 50 becomes larger, and strong spherical aberration in the positive direction occurs. Moreover, the balance of aberrations on the entire wide-angle zoom lens system cannot be maintained.

Specific numerical data of the embodiments will be described hereinafter.

In the diagrams showing spherical aberration and the sine condition, SA designates spherical aberration, and SC designates the sine condition.

In the diagrams of chromatic aberration represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the 9 and C lines; however, the d line as the base line coincides with the ordinate.

In the diagrams of astigmatism, S designates the sagittal image, and M designates the meridional image.

In the tables, $F_{NO}$ designates the f-number, f designates the focal length of the entire wide-angle lens system, $f_B$ designates the back focal distance (the equivalent air thickness along the optical axis from the most image-side surface of the positive fifth lens group 50 to the image plane), w designates the half angle-of-view (*), r designates the radius of curvature, d designates the lens-element thickness or distance between lens elements, $N_d$ designates the refractive index of the d-line, and ! designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^8 + A10y^{10}$$

wherein:

c designates a curvature of the aspherical vertex (1/r);

y designates a distance from the optical axis;

K designates the conic coefficient;

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

Figure 1:
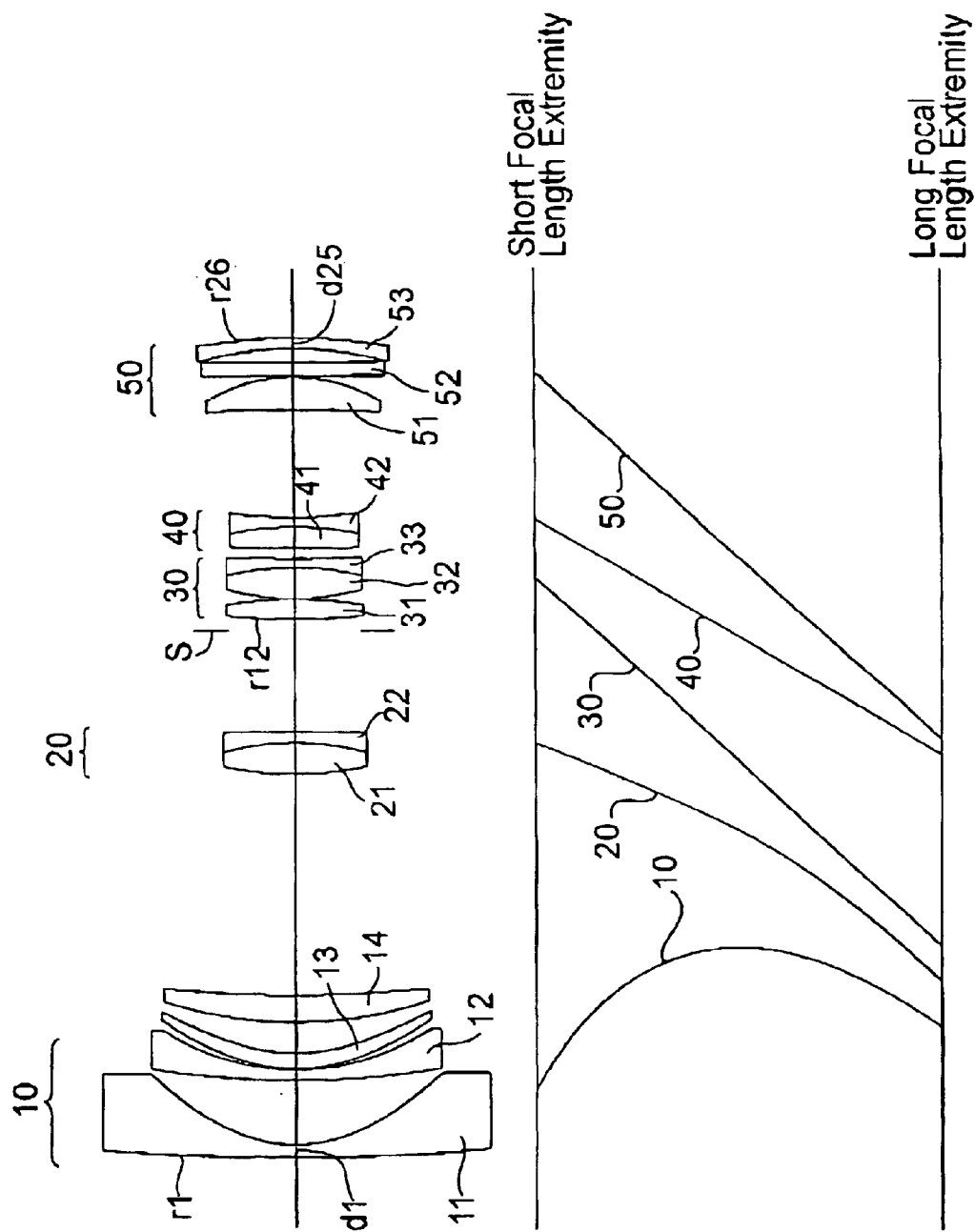
FIG. 1 is a lens arrangement of the wide-angel zoom lens system at the short focal length extremity, according to a first embodiment of the present invention.

FIG. 1 is a lens arrangement of the wide-angel zoom lens system at the short focal length extremity according to the first embodiment of the present invention. FIGS. 2A through 2E show aberrations occurred in the lens arrangement shown in FIG. 1. FIGS. 3A through 3E show aberrations occurred in the lens arrangement shown in FIG. 1 at an intermediate focal length (24.00) on the side of the shorter focal length. FIGS. 4A through 4E show aberrations occurred in the lens arrangement shown in FIG. 1 at an intermediate focal length (35.00) on the side of the longer focal length. FIGS. 5A through 5E show aberrations occurred in the lens arrangement shown in FIG. 1 at the long focal length extremity. Table 1 shows the numerical data of the first embodiment.

The negative first lens group 10 includes a negative meniscus lens element 11 having the convex surface facing toward the object, a negative meniscus lens element 12 having the convex surface facing toward the object, a positive meniscus lens element 13, with a weak refractive power, having the convex surface facing toward the object, and a positive meniscus lens element 14 having the convex surface facing toward the object, in this order from the object.

The positive second lens group 20 includes cemented lens elements having a biconvex positive lens element 21 and a negative lens element 22, in this order from the object.

The positive third lens group 30 includes a positive lens element 31, cemented lens elements having a biconvex positive lens element 32 and a negative lens element 33, in this order from the object.

The negative fourth lens group 40 includes cemented lens elements having a positive lens element 41 and a negative lens element 42, in this order from the object.

The positive fifth lens group 50 includes a positive lens element 51, a negative lens element 52, and a negative meniscus lens element 53 having the convex surface facing toward the image, in this order from the object.

In the negative first lens group 10, the concave surface of the most object-side negative meniscus lens element 11 is an aspherical surface formed by bonding a thin resin layer; and the positive meniscus lens element 13, with a weak refractive power, having the convex surface facing toward the object is an aspherical lens element made of resin.

Furthermore, in the positive fifth lens group 50, the most object-side positive lens element 51 is an aspherical lens element made of resin.

The diaphragm S is provided at 1.70 on the object side of the positive third lens group 30 (in front of surface No. 12).

TABLE 1

FNO. = 1:3.4–3.7–4.5–5.8
f = 18.60–24.00–35.00–53.35
W = 50.8–42.6–31.7–21.9
$f_B$ = 36.99–43.61–55.72–74.22

| Surf. No. | r | d | Nd | ! |
|---|---|---|---|---|
| 1 | 282.135 | 1.60 | 1.71300 / 53.9 | |
| 2 | 23.418 | 0.20 | 1.52700 / 43.7 (resin) | |
| 3* | 17.581 | 8.94 | | |
| 4 | 102.770 | 1.60 | 1.69680 / 55.5 | |
| 5 | 29.830 | 0.10 | | |
| 6* | 20.830 | 2.20 | 1.52538 / 56.3 (resin) | |
| 7* | 21.503 | 4.49 | | |
| 8 | 51.142 | 3.90 | 1.84666 / 23.8 | |
| 9 | 147.819 | 31.58–19.45–8.61–1.40 | | |
| 10 | 42.416 | 4.40 | 1.60342 / 38.0 | |
| 11 | −32.595 | 1.60 | 1.80610 / 40.9 | |
| 12 | −441.748 | 16.25–12.52–6.26–3.10 | | |
| 13 | 78.284 | 2.98 | 1.51742 / 52.4 | |
| 14 | −48.704 | 0.10 | | |
| 15 | 30.798 | 4.46 | 1.51742 / 52.4 | |
| 16 | −37.106 | 1.30 | 1.84666 / 23.8 | |
| 17 | 174.350 | 1.66–3.99–8.26–14.76 | | |
| 18 | 909.325 | 3.04 | 1.69895 / 30.1 | |
| 19 | −39.452 | 1.30 | 1.79952 / 42.2 | |
| 20 | 57.044 | 15.40–13.07–8.81–2.30 | | |
| 21* | −3344.056 | 4.55 | 1.52538 / 56.3 (resin) | |
| 22 | 21.541 | 0.10 | | |
| 23 | 790.017 | 2.01 | 1.55963 / 61.2 | |
| 24 | 886.113 | 1.98 | | |
| 25 | −41.556 | 1.50 | 1.84666 / 23.9 | |
| 26 | −72.183 | — | | |

*designates the aspherical surface which is rotationally symmetrical with respect to the optical axis.

Aspherical surface data (the aspherical surface coefficients not indicated are zero (0.00)):

| Surf. No. | K | A4 |
|---|---|---|
| 3 | −0.10000 × 10 | −0.11630 × 10⁻⁶ |
| 6 | −0.10000 × 10 | −0.28609 × 10⁻⁵ |
| 7 | −0.10000 × 10 | −0.95796 × 10⁻⁵ |
| 21 | −0.10000 × 10 | −0.20968 × 10⁻⁴ |

| Surf. No. | A6 | A8 |
|---|---|---|
| 3 | −0.18732 × 10⁻⁷ | 0.30062 × 10⁻¹⁰ |
| 6 | −0.26403 × 10⁻⁷ | 0.71114 × 10⁻¹⁰ |
| 7 | −0.21000 × 10⁻⁷ | 0.48454 × 10⁻¹⁰ |
| 21 | −0.22282 × 10⁻⁷ | 0.54838 × 10⁻¹⁰ |

[Embodiment 2]

Figure 6:
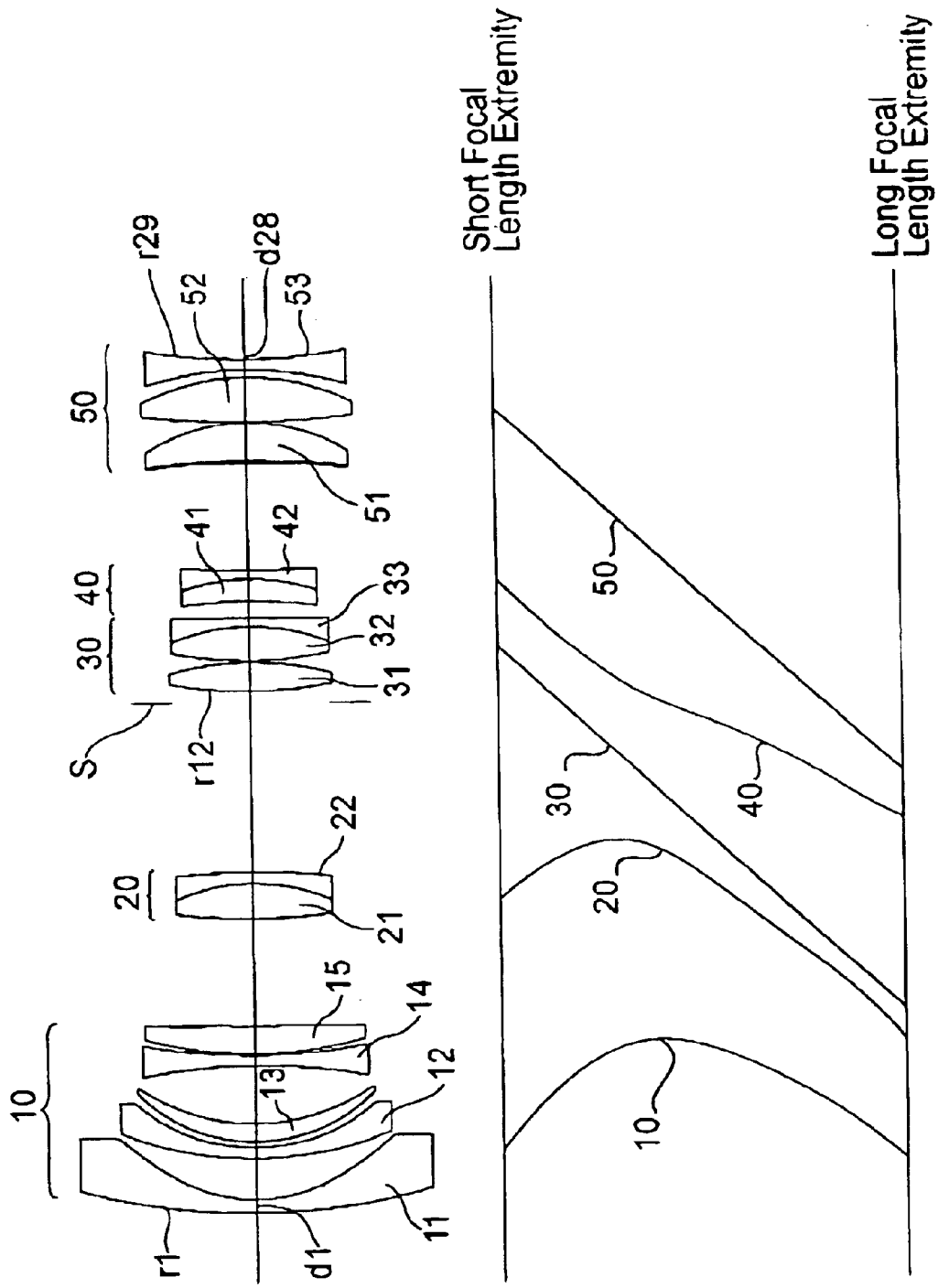
FIG. 6 is a lens arrangement of the wide-angel zoom lens system at the short focal length extremity, according to a second embodiment of the present invention.

FIG. 6 is a lens arrangement of the wide-angel zoom lens system at the short focal length extremity according to the second embodiment of the present invention. FIGS. 7A through 7E show aberrations occurred in the lens arrangement shown in FIG. 6. FIGS. 8A through 8E show aberrations occurred in the lens arrangement shown in FIG. 6 at an intermediate focal length (24.00) on the side of the shorter focal length. FIGS. 9A through 9E show aberrations occurred in the lens arrangement shown in FIG. 6 at an intermediate focal length (35.04) on the side of the longer focal length. FIGS. 10A through 10E show aberrations occurred in the lens arrangement shown in FIG. 6 at the long focal length extremity. Table 2 shows the numerical data of the second embodiment.

The negative first lens group 10 includes a negative meniscus lens element 11 having the convex surface facing toward the object, a negative meniscus lens element 12 having the convex surface facing toward the object, a positive meniscus lens element 13, with a weak refractive power, having the convex surface facing toward the object, a biconcave negative lens element 14, and a positive meniscus lens element 15 having the convex surface facing toward the object, in this order from the object.

The positive fifth lens group 50 includes a positive lens element 51, a positive lens element 52, and a biconcave negative lens element 53, in this order from the object.

In the negative first lens group 10, the concave surface of the most object-side negative meniscus lens element 11 is an aspherical surface formed by bonding a thin resin layer; and the positive meniscus lens element 13, with a weak refractive power, having the convex surface facing toward the object is an aspherical lens element made of resin.

Furthermore, in the positive fifth lens group 50, the object-side surface of the most object-side positive lens element 51 is an aspherical surface formed by bonding a thin resin layer.

The basic arrangements of the positive second lens group 20, the positive third lens group 30 and the negative fourth lens group 40 are the same as those of the first embodiment.

The diaphragm S is provided at 1.70 on the object side of the positive third lens group 30 (in front of surface No.12).

TABLE 2

FNO. = 1:3.3–3.7–4.4–5.8
f = 18.60–24.00–35.04–53.34
W = 50.8–42.7–31.5–21.7
$f_B$ = 38.09–46.29–58.18–76.76

| Surf. No. | r | d | Nd / ! |
|---|---|---|---|
| 1 | 79.276 | 1.60 | 1.80400 / 46.6 |
| 2 | 22.879 | 0.30 | 1.52700 / 43.7 (resin) |
| 3* | 18.377 | 5.75 | |
| 4 | 42.505 | 1.60 | 1.77250 / 49.6 |
| 5 | 22.746 | 0.86 | |
| 6 | 20.801 | 2.50 | 1.52538 / 56.3 (resin) |
| 7* | 24.676 | 8.35 | |
| 8 | -71.771 | 1.50 | 1.69680 / 55.5 |
| 9 | 71.771 | 0.16 | |
| 10 | 46.627 | 4.10 | 1.84666 / 23.8 |
| 11 | 761.058 | 15.54–12.31–6.86–1.51 | |
| 12 | 69.053 | 5.04 | 1.59551 / 39.2 |
| 13 | -23.456 | 1.60 | 1.83400 / 37.2 |
| 14 | -89.400 | 26.18–12.56–4.39–3.10 | |
| 15 | 49.460 | 4.14 | 1.51633 / 64.1 |
| 16 | -36.708 | 0.20 | |
| 17 | 43.573 | 5.11 | 1.51633 / 64.1 |
| 18 | -25.073 | 1.30 | 1.85026 / 32.3 |
| 19 | -1098.297 | 2.39–2.52–7.50–15.49 | |
| 20 | -59.457 | 3.14 | 1.84666 / 23.8 |
| 21 | -25.425 | 1.30 | 1.78590 / 44.2 |
| 22 | 135.314 | 15.40–15.27–10.28–2.30 | |
| 23* | -2678.694 | 0.30 | 1.52700 / 43.7 (resin) |
| 24 | -113.799 | 5.42 | 1.55963 / 61.2 |
| 25 | -23.286 | 0.10 | |
| 26 | 99.154 | 6.53 | 1.51633 / 64.1 |
| 27 | -28.885 | 1.03 | |
| 28 | -43.520 | 1.50 | 1.85026 / 32.3 |
| 29 | 62.884 | — | |

*designates the aspherical surface which is rotationally symmetrical with respect to the optical axis.

Aspherical surface data (the aspherical surface coefficients not indicated are zero (0.00)):

| Surf. No. | K | A4 |
|---|---|---|
| 3 | $-0.10000 \times 10$ | $0.83218 \times 10^{-6}$ |
| 7 | $-0.10000 \times 10$ | $0.86049 \times 10^{-5}$ |
| 23 | $-0.10000 \times 10$ | $-0.28311 \times 10^{-4}$ |

-continued

| Surf. No. | A6 | A8 |
|---|---|---|
| 3 | $0.18285 \times 10^{-7}$ | $-0.54982 \times 10^{-10}$ |
| 7 | $-0.23086 \times 10^{-7}$ | $0.11096 \times 10^{-9}$ |
| 23 | $-0.34547 \times 10^{-8}$ | $-0.32575 \times 10^{-10}$ |

[Embodiment 3]

FIG. 11 is a lens arrangement of the wide-angel zoom lens system at the short focal length extremity according to the third embodiment of the present invention. FIGS. 12A through 12E show aberrations occurred in the lens arrangement shown in FIG. 11. FIGS. 13A through 13E show aberrations occurred in the lens arrangement shown in FIG. 11 at an intermediate focal length (23.98) on the side of the shorter focal length. FIGS. 14A through 14E show aberrations occurred in the lens arrangement shown in FIG. 11 at an intermediate focal length on the side of the longer focal length. FIGS. 15A through 15E show aberrations occurred in the lens arrangement shown in FIG. 11 at the long focal length extremity. Table 3 shows the numerical data of the third embodiment.

The positive fifth lens group 50 includes a resin-molded positive lens element 51, and cemented lens elements having a negative lens element 52 and a positive lens element 53, in this order from the object.

The basic arrangements of the negative first lens group 10, the positive second lens group 20, the positive third lens group 30 and the negative fourth lens group 40 are the same as those of the first embodiment.

The diaphragms is provided at 1.70 on the object side of the positive third lens group 30 (in front of surface No.12).

TABLE 3

FNO. = 1:3.4–3.8–4.5–5.8
f = 18.60–23.98–35.00–53.341
W = 50.8–42.4–31.5–21.8
$f_B$ = 37.00–43.38–55.01–72.79

| Surf. No. | r | d | Nd / ! |
|---|---|---|---|
| 1 | 240.793 | 1.60 | 1.69680 / 55.5 |
| 2 | 23.713 | 0.20 | 1.52700 / 43.7 (resin) |
| 3* | 18.002 | 9.06 | |
| 4 | 102.026 | 1.60 | 1.69680 / 55.5 |
| 5 | 30.476 | 0.10 | |
| 6* | 20.304 | 2.20 | 1.52538 / 56.3 (resin) |
| 7* | 20.376 | 5.86 | |
| 8 | 55.499 | 3.62 | 1.84666 / 23.8 |
| 9 | 146.313 | 31.71–19.36–8.66–1.40 | |
| 10 | 44.245 | 4.24 | 1.60342 / 38.0 |
| 11 | -39.732 | 1.60 | 1.80610 / 40.9 |
| 12 | 7212.805 | 18.69–14.75–7.38–3.10 | |
| 13 | 90.075 | 3.19 | 1.51742 / 52.4 |
| 14 | -39.962 | 0.10 | |
| 15 | 31.139 | 4.46 | 1.51742 / 52.4 |
| 16 | -36.601 | 1.30 | 1.84666 / 23.8 |
| 17 | 222.957 | 1.79–4.12–8.38–14.68 | |
| 18 | -375.317 | 2.99 | 1.69895 / 30.1 |
| 19 | -23.206 | 1.30 | 1.79952 / 42.2 |
| 20 | 89.088 | 15.40–13.06–8.81–2.30 | |
| 21* | 119.292 | 4.48 | 1.52538 / 56.3 (resin) |
| 22 | -25.697 | 0.10 | |
| 23 | -5632.116 | 1.50 | 1.83400 / 37.2 |
| 24 | 24.364 | 5.32 | 1.51742 / 52.4 |
| 25 | -265.456 | – | |

*designates the aspherical surface which is rotationally symmetrical with respect to the optical axis.

Aspherical surface data (the aspherical surface coefficients not indicated are zero (0.00)):

| Surf. No. | K | A4 |
|---|---|---|
| 3 | $-0.10000 \times 10$ | $0.29563 \times 10^{-5}$ |
| 6 | $-0.10000 \times 10$ | $-0.23265 \times 10^{-5}$ |
| 7 | $-0.10000 \times 10$ | $-0.86218 \times 10^{-5}$ |
| 21 | $-0.10000 \times 10$ | $-0.18068 \times 10^{-4}$ |

| Surf. No. | A6 | A8 |
|---|---|---|
| 3 | $-0.17807 \times 10^{-7}$ | $0.13876 \times 10^{-10}$ |
| 6 | $-0.28621 \times 10^{-7}$ | $0.11896 \times 10^{-9}$ |
| 7 | $-0.17031 \times 10^{-7}$ | $0.10722 \times 10^{-9}$ |
| 21 | $0.11262 \times 10^{-7}$ | $0.67757 \times 10^{-10}$ |

[Embodiment 4]

FIG. 16 is a lens arrangement of the wide-angel zoom lens system at the short focal length extremity according to the fourth embodiment of the present invention. FIGS. 17A through 17E show aberrations occurred in the is lens arrangement shown in FIG. 16. Figures 18A through 18E show aberrations occurred in the lens arrangement shown in FIG. 16 at an intermediate focal length (24.00) on the side of the shorter focal length. FIGS. 19A through 19E show aberrations occurred in the lens arrangement shown in FIG. 16 at an intermediate focal length (35.04) on the side of the longer focal length. FIGS. 20A through 20E show aberrations occurred in the lens arrangement shown in FIG. 16 at the long focal length extremity. Table 4 shows the numerical data of the fourth embodiment.

The negative first lens group 10 includes a negative meniscus lens element 11 having the convex surface facing toward the object, a negative meniscus lens element 12 having the convex surface facing toward the object, a biconcave negative lens element 13, and a positive meniscus lens element 14 having the convex surface facing toward the object, in this order from the object.

The positive fifth lens group 50 includes a positive lens element 51, and cemented lens elements having a negative lens element 52 and a positive lens element 53, in this order from the object.

In the negative first lens group 10, the concave surface of the most object-side negative meniscus lens element 11 is an aspherical surface formed by bonding a thin resin layer; and the biconcave negative lens element 13 is made of glass.

Furthermore, in the positive fifth lens group 50, the object-side surface of the most object-side positive lens element 51 is an aspherical surface formed by bonding a thin resin layer.

The diaphragms is provided at 1.70 on the object side of the positive third lens group 30 (in front of surface No.12).

TABLE 4

FNO. = 1:3.5–3.8–4.5–5.8
f = 18.60–24.00–35.00–53.34
W = 50.8–42.3–31.1–21.5
$f_B$ = 39.38–48.08–59.74–74.51

| Surf. No. | r | d | Nd | ! |
|---|---|---|---|---|
| 1 | 71.009 | 1.60 | 1.80400 / 46.6 | |
| 2 | 21.734 | 0.30 | 1.52700 / 43.7 (resin) | |
| 3* | 17.586 | 6.40 | | |
| 4 | 41.805 | 1.60 | 1.77250 / 49.6 | |
| 5 | 25.044 | 7.89 | | |
| 6 | −82.736 | 1.50 | 1.69680 / 55.5 (glass) | |
| 7 | 82.736 | 0.12 | | |
| 8 | 41.175 | 4.16 | 1.84666 / 23.8 | |

TABLE 4-continued

FNO. = 1:3.5–3.8–4.5–5.8
f = 18.60–24.00–35.00–53.34
W = 50.8–42.3–31.1–21.5
$f_B$ = 39.38–48.08–59.74–74.51

| Surf. No. | r | d | Nd | ! |
|---|---|---|---|---|
| 9 | 196.553 | | 18.61–15.12–8.93–1.52 | |
| 10 | 67.632 | 4.64 | 1.56732 / 42.8 | |
| 11 | −24.451 | 1.60 | 1.80610 / 40.9 | |
| 12 | −97.694 | | 27.54–13.60–3.92–3.10 | |
| 13 | 61.623 | 4.31 | 1.51633 / 64.1 | |
| 14 | −31.194 | 0.20 | | |
| 15 | 35.960 | 5.18 | 1.51633 / 64.1 | |
| 16 | −23.330 | 1.30 | 1.80610 / 33.3 | |
| 17 | −539.305 | | 2.44–2.45–6.47–15.53 | |
| 18 | −66.396 | 2.40 | 1.80518 / 25.4 | |
| 19 | −28.215 | 1.30 | 1.77250 / 49.6 | |
| 20 | 92.939 | | 15.40–15.38–11.37–2.30 | |
| 21* | 153.678 | 0.30 | 1.52700 / 43.7 (resin) | |
| 22 | −118.608 | 5.68 | 1.65160 / 58.5 | |
| 23 | −21.850 | 1.61 | | |
| 24 | −98.915 | 1.50 | 1.83400 / 37.2 | |
| 25 | 28.490 | 6.35 | 1.56384 / 60.7 | |
| 26 | −88.596 | — | | |

*designates the aspherical surface which is rotationally symmetrical with respect to the optical axis.

Aspherical surface data (the aspherical surface coefficients not indicated are zero (0.00)):

| Surf. No. | K | A4 |
|---|---|---|
| 3 | $-0.10000 \times 10$ | $0.25448 \times 10^{-5}$ |
| 21 | $-0.10000 \times 10$ | $-0.25469 \times 10^{-4}$ |

| Surf. No. | A6 | A8 |
|---|---|---|
| 3 | $0.87109 \times 10^{-8}$ | $-0.25017 \times 10^{-10}$ |
| 21 | $0.31819 \times 10^{-8}$ | $-0.10737 \times 10^{-10}$ |

Table 5 shows the numerical values for each condition in each embodiment.

TABLE 5

| | Embod. 1 | Embod. 2 | Embod. 3 | Embod. 4 |
|---|---|---|---|---|
| Cond. (1) | 2.295 | 0.608 | 1.944 | 0.699 |
| Cond. (2) | 2.480 | 2.152 | 2.619 | 2.390 |
| Cond. (3) | 2.002 | 2.079 | 1.924 | 1.889 |
| Cond. (4) | 0.042 | 0.101 | 0.026 | |
| Cond. (5) | 0.401 | 0.464 | 0.441 | 0.545 |
| Cond. (6) | −0.294 | −0.331 | −0.284 | −0.362 |

In Table 5, no numerical value of condition (4) for the fourth embodiment is indicated, since a meniscus lens element having the convex surface facing toward the object is not provided in the fourth embodiment.

Except for the above numerical value of condition (4) in the fourth embodiment, the numerical values of the first through fourth embodiments satisfy the conditions (1) through (6). Furthermore, as shown in the aberration drawings, the various aberrations are adequately corrected.

According to the above description, a wide-angle zoom lens system, in which (i) the angle-of-view of at the short focal length extremity is more than 100γ, (ii) a zoom ratio is approximately 2.9, and (iii) the diameter of lens elements is smaller, can be achieved.

What is claimed is:

1. A wide-angle zoom lens system comprising a negative first lens group, a positive second lens group, a positive third lens group, a negative fourth lens group, and a positive fifth lens group, in this order from an object;

wherein upon zooming from the short focal length extremity to the long focal length extremity, said negative first lens group first moves toward an image and thereafter moves toward said object, the distance between said negative first lens group and said positive second lens group decreases, the distance between said positive second lens group and said positive third lens group decreases, the distance between said positive third lens group and said negative fourth lens group increases, and the distance between said negative fourth lens group and said positive fifth lens group decreases;

wherein said wide-angle zoom lens system satisfies the following conditions:

$0.3 < dL_{1-2}/dL_{2-3} < 5.0$ $2.1 < (L_{t-2} + L_{2-3})/fW < 5.5$ wherein $dL_{1-2}$ designates the difference in the distance between said negative first lens group and said positive second lens group at the short focal length extremity and the distance therebetween at the long focal length extremity;

$dL_{2-3}$ designates the difference in the distance between said positive second lens group and said positive third lens group at the short focal length extremity and the distance therebetween at the long focal length extremity;

$L_{1-2}$ designates the distance between said negative first lens group and said positive second lens group at the short focal length extremity:

$_{2-3}$ designates the distance between said positive third lens group and said negative fourth lens group at the short focal length extremity; and fw designates the focal length of said entire wide-angle zoom lens system at the short focal length extremity.

2. The wide-angle zoom lens system according to claim 1, wherein said positive third lens group and said positive fifth lens group are arranged to move integrally upon zooming.

3. The wide-angle zoom lens system according to claim 1, further satisfying the following condition:

$1.7 < d_{X3}/fw < 4.0$ wherein $d_{X3}$ designates the traveling distance of said positive third lens group from the short focal length extremity to the long focal length extremity; and fw designates the focal length of said entire wide-angle zoom lens system at the short focal length extremity.

4. The wide-angle zoom lens system according to claim 1, wherein said positive third lens group and said negative fourth lens group are arranged to move linearly upon zooming.

5. The wide-angle zoom lens system according to claim 1, wherein said negative first lens group comprises a negative first meniscus lens element having the convex surface facing toward said object, a negative second meniscus lens element having the convex surface facing toward said object, and a third meniscus lens element having the convex surface facing toward said object, in this order from said object, wherein said third meniscus lens element is made of resin; and wherein said negative first lens group satisfies the following condition:

$|f1/f_{L3}| < 0.2$ wherein f1 designates the focal length of said negative first lens group; and $f_{L3}$ designates the focal length of said third meniscus lens element in said negative first lens group.

6. The wide-angle zoom lens system according to claim 1, further satisfying the following condition:

$0.2 < fw/f3 < 0.9$ wherein designates the focal length of said positive third lens group; and fw designates the focal length of said entire wide-angle zoom lens system at the short focal length extremity.

7. The wide-angle zoom lens system according to claim 1, further satisfying the following condition:

$<0.6 < fw/f4 < -0.1$ wherein f4 designates the focal length of said negative fourth lens group; and fw designates the focal length of said entire wide-angle zoom lens system at the short focal length extremity.

8. A wide-angle zoom lens system comprising a negative first lens group, a positive second lens group, a positive third lens group, a negative fourth lens group, and a positive fifth lens group, in this order from an object, wherein said positive third lens group and said positive fifth lens group are arranged to move integrally upon zooming;

wherein upon zooming from the short focal length extremity to the long focal length extremity, said negative first lens group first moves toward an image and thereafter moves toward said object, the distance between said negative first lens group and said positive second lens group decreases, the distance between said positive second lens group and said positive third lens group decreases, the distance between said positive third lens group and said negative fourth lens group increases, and the distance between said negative fourth lens group and said positive fifth lens group decreases;

wherein said wide-angle zoom lens system satisfies the following condition:

$0.3 < dL_{1-2}/dL_{2-3} < 5.0$ wherein $dL_{1-2}$ designates the difference in the distance between said negative first lens group and said positive second lens group at the short focal length extremity and the distance therebetween at the long focal length extremity; and $dL_{2-3}$ designates the difference in the distance between said positive second lens group and said positive third lens group at the short focal length extremity and the distance therebetween at the long focal length extremity.

9. The wide-angle zoom lens system according to claim 8, further satisfying the following condition:

$1.7 < d_{X3}fw < 4.0$ wherein $d_{X3}$ designates the traveling distance of said positive third lens group from the short focal length extremity to the long focal length extremity; and fw designates the focal length of said entire wide-angle zoom lens system at the short focal length extremity.

10. The wide-angle zoom lens system according to claim 8, wherein said positive third lens group and said negative fourth lens group are arranged to move linearly upon zooming.

11. The wide-angle zoom lens system according to claim 8, wherein said negative first lens group comprises a negative first meniscus lens element having the convex surface facing toward said object, a negative second meniscus lens element having the convex surface facing toward said object, and a third meniscus lens element having the convex surface facing toward said object, in this order from said object, wherein said third meniscus lens element is made of resin; and wherein said negative first lens group satisfies the following condition:

$$|f1/f_{L3}|<0.2$$

wherein f1 designates the focal length of said negative first lens group; and $f_{L3}$ designates the focal length of said third meniscus lens element in said negative first lens group.

12. The wide-angle zoom lens system according to claim 8, further satisfying the following condition:

$$0.2<fw/f3<0.9$$

wherein f3 designates the focal length of said positive third lens group; and fw designates the focal length of said entire wide-angle zoom lens system at the short focal length extremity.

13. The wide-angle zoom lens system according to claim 8, further satisfying the following condition:
ti $-0.6<fw/f4<-0.1$ wherein f4 designates the focal length of said negative fourth lens group; and fw designates the focal length of said entire wide-angle zoom lens system at the short focal length extremity.

14. A wide-angle zoom lens system comprising a negative first lens group, a positive second lens group, a positive third lens group, a negative fourth lens group, and a positive fifth lens group, in this order from an object, wherein said positive third lens group and said negative fourth lens group are arranged to move linearly upon zooming, wherein upon zooming from the short focal length extremity to the long focal length extremity, said negative first lens group first moves toward an image and thereafter moves toward said object, the distance between said negative first lens group and said positive second lens group decreases, the distance between said positive second lens group and said positive third lens group decreases, the distance between said positive third lens group and said negative fourth lens group increases, and the distance between said negative fourth lens group and said positive fifth lens group decreases;

wherein said wide-angle zoom lens system satisfies the following condition:

$$0.3<dL_{1-2}/dL_{2-3}<5.0$$

wherein $dL_{1-2}$ designates the difference in the distance between said negative first lens group and said positive second lens group at the short focal length extremity and the distance therebetween at the long focal length extremity; and $dL_{2-3}$ designates the difference in the distance between said positive second lens group and said positive third lens group at the short focal length extremity and the distance therebetween at the long focal length extremity.

15. The wide-angle zoom lens system according to claim 14, further satisfying the following condition:

$$1.7<d_{X3}/fw<4.0$$

wherein $d_{X3}$ designates the traveling distance of said positive third lens group from the short focal length extremity to the long focal length extremity; and fw designates the focal length of said entire wide-angle zoom lens system at the short focal length extremity.

16. The wide-angle zoom lens system according to claim 14, wherein said negative first lens group comprises a negative first meniscus lens element having the convex surface facing toward said object, a negative second meniscus lens element having the convex surface facing toward said object, and a third meniscus lens element having the convex surface facing toward said object, in this order from said object, wherein said third meniscus lens element is made of resin; and wherein said negative first lens group satisfies the following condition:

$$|f1/f_{L3}|<0.2$$

wherein f1 designates the focal length of said negative first lens group; and $f_{L3}$ designates the focal length of said third meniscus lens element in said negative first lens group.

17. The wide-angle zoom lens system according to claim 14, further satisfying the following condition:

$$0.2<fw/f3<0.9$$

wherein f3 designates the focal length of said positive third lens group; and fw designates the focal length of said entire wide-angle zoom lens system at the short focal length extremity.

18. The wide-angle zoom lens system according to claim 14, further satisfying the following condition:

$$-0.6<fw/f4<-0.1$$

f4 designates the focal length of said negative fourth lens group; and fw designates the focal length of said entire wide-angle zoom lens system at the short focal length extremity.

* * * * *